US011132509B1

(12) United States Patent
Pasko et al.

(10) Patent No.: US 11,132,509 B1
(45) Date of Patent: Sep. 28, 2021

(54) UTILIZATION OF NATURAL LANGUAGE UNDERSTANDING (NLU) MODELS

(71) Applicant: Amazon Technologies, Inc., Seattle, WA (US)

(72) Inventors: Stanislaw Ignacy Pasko, Zawonia (PL); Ross William McGowan, Pittsburgh, PA (US); Aliaksei Kuzmin, Gdansk (PL); Rui Liu, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 420 days.

(21) Appl. No.: 16/208,463

(22) Filed: Dec. 3, 2018

(51) Int. Cl.
*G06F 40/295* (2020.01)
*G06K 9/62* (2006.01)
*G10L 15/19* (2013.01)

(52) U.S. Cl.
CPC ......... *G06F 40/295* (2020.01); *G06K 9/6267* (2013.01); *G10L 15/19* (2013.01)

(58) Field of Classification Search
CPC ..................................................... G10L 15/30
USPC ................................................................ 704/9
See application file for complete search history.

(56) References Cited

U.S. PATENT DOCUMENTS

| 9,990,176 B1* | 6/2018 | Gray .................. G06F 3/165 |
| 10,600,406 B1* | 3/2020 | Shapiro ................ G10L 15/22 |
| 2015/0149176 A1* | 5/2015 | Giulianelli ............. G06F 40/30 |
| | | 704/257 |
| 2016/0094602 A1* | 3/2016 | Fuh ....................... H04L 65/60 |
| | | 709/219 |

* cited by examiner

*Primary Examiner* — Bhavesh M Mehta
*Assistant Examiner* — Timothy Nguyen
(74) *Attorney, Agent, or Firm* — Lee & Hayes, P.C.

(57) ABSTRACT

A speech interface device is configured to perform natural language understanding (NLU) processing in a manner that optimizes the use of resources on the speech interface device. In an example process, a domain classifier(s) is used to generate domain classifier scores associated with multiple candidate domains, and the candidate domains can then be evaluated, one candidate domain at a time, in accordance with the domain classifier scores (e.g., starting with a highest scoring candidate domain). For each candidate domain undergoing the evaluation, input data is by that domain's NLU model(s), and, as soon as a domain-specific NLU model(s) produces a NLU result with a confidence score that satisfies a threshold confidence score, the evaluation can be stopped for any remaining candidate domains.

20 Claims, 6 Drawing Sheets

UTILIZATION OF NATURAL LANGUAGE UNDERSTANDING (NLU) MODELS

BACKGROUND

Homes and other user premises are increasingly equipped with always-on Internet or "cloud" connectivity. The constant, or nearly constant, availability of wide area network communications, in combination with increasing capabilities of computing devices—including hands-free, speech interface devices—have created a number of new possibilities for services that use voice assistant technology with in-home connected devices. For example, various cloud-based services (e.g., music streaming, smart home control, etc.) may be accessible to users through convenient, hands-free interaction with their in-home speech interface devices.

Provided herein are technical solutions to improve and enhance these and other systems.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
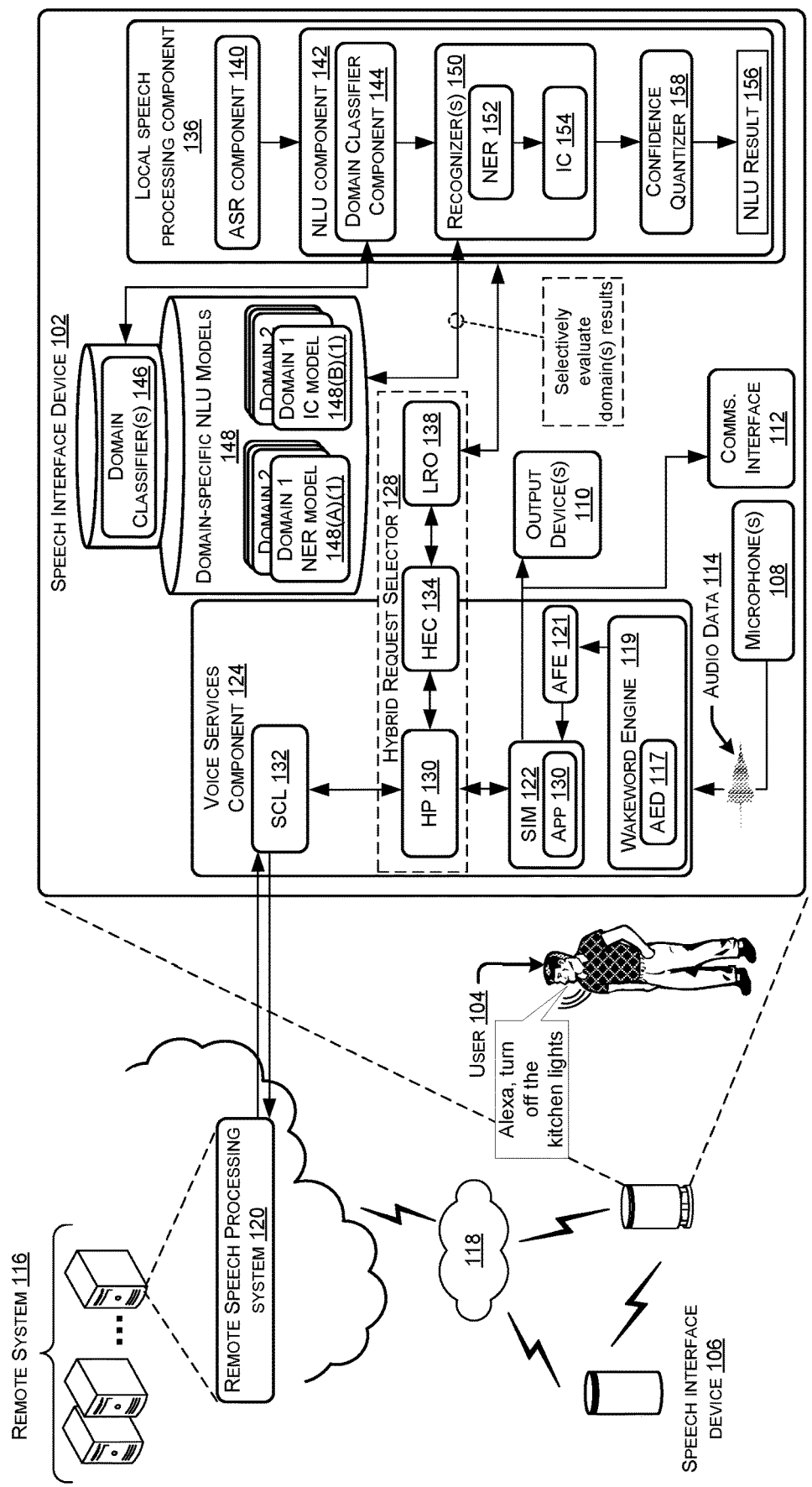
FIG. 1 is a block diagram illustrating a system including a speech interface device that is capable of performing local natural language understanding (NLU) processing by selectively evaluating NLU results produced by domain-specific NLU models, which optimizes the utilization of local resources of the speech interface device.

Described herein are, among other things, techniques, devices, and systems, including a speech interface device that is configured to perform local natural language understanding (NLU) processing in a manner that optimizes the utilization of local resources of the speech interface device. For example, local NLU processing may involve selectively evaluating NLU results produced by domain-specific NLU models to conserve local resources on the speech interface device.

In an illustrative example, a speech interface device may reside within an environment (e.g., in a home, automobile, office, hotel, etc.), perhaps along with one or more additional devices (including, for example, other speech interface devices, one or more second devices, such as home automation devices, mobile phone, tablet, TV, wireless speaker, etc.). The speech interface device is configured with "hybrid" functionality, which allows the speech interface device to process user speech locally as well as sending the same audio data (or some derivative thereof) to a remote system for processing. The speech interface device can also be configured to decide on its own and/or be instructed (by the remote system) whether to respond to user speech using response data from a remote speech processing system, or response data from a local speech processing component. This hybrid functionality, allows the speech interface device to respond to user speech, even in instances when a remote system—which, when available, can be used for processing user speech remotely—is, for example, unavailable to, slower than (with network-related latency factored in), or otherwise less preferred than the speech interface device.

The speech interface device may process user speech locally by inputting data (input data) to a NLU component executing on the speech interface device. The input data received by the NLU component may be audio data (that represents user speech) or data generated based on the audio data (e.g., text data). A domain classifier(s) may receive the input data, and may generate, as output, domain classifier scores associated with multiple domains (sometimes referred to herein as "candidate domains"). These domain classifier scores may indicate respective probabilities of the multiple candidate domains being capable of generating a relevant NLU result based on the ASR text data. The NLU component may then conduct an evaluation of the multiple candidate domains, one candidate domain at a time, in accordance with the domain classifier scores (e.g., in accordance with a ranked order of the domain classifier scores, such as from a highest score to a lowest score). This evaluation includes inputting the input data to one or more domain-specific NLU models that correspond to the candidate domain that is undergoing the evaluation. The domain-specific NLU models corresponding to a given candidate domain may include a domain-specific named entity recognition (NER) model and a domain-specific intent classification (IC) model. The NLU component may determine, based at least in part on output from the domain-specific NLU model(s), a domain-specific NLU result associated with the candidate domain undergoing the evaluation, and a confidence score associated with the domain-specific NLU result. This confidence score can be used to determine whether to stop the evaluation, or to continue the evaluation for the next candidate domain in the sequence. Assuming at least one of the domain-specific NLU results is sufficient for responding to the user speech (e.g., as determined from the confidence scores associated with the domain-specific NLU results), the NLU component selects one of the domain-specific NLU results as a candidate NLU result that is usable to cause the speech interface device to perform an action in response to the user speech. The reason that the selected local NLU result is considered a "candidate" NLU result is because the speech interface device may also receive response data from a remote speech processing system, and the speech interface device may respond to the user speech using either the remote response data it may receive over the network, or the local response data generated from the selected local NLU result. If the remote response data is used for responding to the user speech, the local response data is not used for responding to the user speech.

By selectively evaluating the multiple candidate domains, the candidate domain that is most likely to produce the best NLU result for a given utterance can be evaluated first, followed by the next most likely domain, and so on. This increases the chance of generating a usable NLU result before evaluating less likely candidate domains. Furthermore, the criteria for stopping the selective evaluation of candidate domains early can be configured according to the amount of local resources that are available on the speech interface device. For instance, the most resource-constrained speech interface devices can use an algorithm that stops the evaluation of candidate domains during NLU processing as soon as a NLU result is produced with an above-threshold confidence score. In this case, the threshold confidence score may be set to a level that increases the probability of producing a threshold-satisfying confidence score early in the evaluation process. For less resource-constrained speech interface devices with a greater amount of local resources, the algorithm may be tuned differently by changing a confidence score threshold that is used to stop the evaluation. In this case, NLU results that are produced with a confidence score that satisfies a first (e.g., lower) threshold and fails to satisfy a second (e.g., upper) threshold can be set aside while the evaluation continues in order to determine if a better NLU result is produced with a confidence score that satisfies both the first threshold and the second threshold. These are merely two examples of the types of NLU model optimizations described herein, which can optimally utilize the available local computing resources of the speech interface device.

The techniques and systems described herein may provide various technical benefits. For instance, parallelization (e.g., running multiple domain-specific NLU models in parallel) can be eliminated, which, in turn, conserves local resources (e.g., processing resources, etc.) on the speech interface device and reduces perceived latency. By contrast, a typical NLU modeling architecture used by a backend speech processing system is capable of performing NLU processing for multiple domains in parallel, and then using re-ranking models for selecting the best NLU result among the NLU results produced by the multiple domains. While this might allow for producing the best possible NLU result, the parallel NLU processing of multiple domains is a relatively computationally-intensive set of tasks, which can be an issue on a more resource-constrained speech interface device. That is, implementing a fully-parallelized NLU modeling architecture on a speech interface device can negatively impact other local processing tasks by increasing latency and thereby degrading the user experience. The techniques and systems described herein reduce local resource consumption, as compared to the resource consumption of a fully-parallelized approach for NLU processing that is typical of a remote speech processing system. Thus, the NLU component, and other local components, can perform their respective processing tasks faster, thereby reducing latency. Not only does this affect the latency of local speech processing in isolation, but it also reduces latency with respect to the processing of remote directive data received from a remote speech processing system. This is because local computing resources are tasked with processing the remote directive data when it is received at the speech interface device, and if the remote directive data is received before the local speech processing component finishes processing the user speech locally, the disclosed NLU model optimizations will alleviate some of the impact that local speech processing has on the local processing of the remote directive data. A "computationally-intensive processing operation," as used herein (e.g., in the context of the previous paragraph), means a processing operation that consumes or utilizes, on average, a percentage of the total processing and/or memory resources of the speech interface device that is above a predetermined threshold percentage and/or that takes a particular amount of time to complete.

Furthermore, in the case where the NLU component starts selectively evaluating domain-specific NLU results, but stops the evaluation early before all of the candidate domains have been evaluated, the techniques and systems described herein conserve local computing resources by refraining from unnecessarily running the domain-specific NLU models for one or more candidate domains that are unlikely to improve upon the already-generated NLU result of a particular candidate domain. Although there is some risk that the disclosed techniques and systems will produce NLU results that are not the absolute highest-quality NLU results the speech interface device is capable of producing if all domains were evaluated in parallel, the tradeoff for the conservation of local resources and the reduction in latency is worthwhile because, in most cases, the local speech recognition result will be very close to what the remote speech processing system would produce for the same utterance. This parity between the local NLU result and the remote NLU result is due to the fact that the domain classifier(s) is configured to generate a distinctive (e.g., distinctively high) domain classifier score for just one candidate domain of the multiple domains available to the speech interface device, meaning that the domain selected by the speech interface device will often be the same domain selected by the remote speech processing system, and the respective NLU results are likely to be similar, in most cases.

FIG. 1 is a block diagram illustrating a system 100 including a speech interface device 102 that is capable of performing local natural language understanding (NLU) processing by selectively evaluating NLU results produced by domain-specific NLU models, which optimizes the utilization of local resources of the speech interface device 102. Optimizing the utilization of local computing resources (e.g., processing resources, etc.) of the speech interface device 102 can a reduce latency so that the user experience with the speech interface device 102 is not negatively impacted by local processing tasks taking too long.

The speech interface device 102 may be located within an environment to provide various capabilities to a user 104, when the user 104 is also in the environment. The environment in which the speech interface device 102 is located may be a home or other premises, an automobile, or any similar environment. Such an environment may include other devices including additional speech interface devices, such as the speech interface device 106, and/or second devices (e.g., Internet of Things (IoT) devices and/or smart home devices like thermostats, lights, refrigerators, ovens, etc.) that may be controllable by speech interface devices, such as the speech interface device 102. When acting as a hub, the speech interface device 102 may be configured to connect a plurality of devices in an environment and control communications among them, thereby serving as a place of convergence where data arrives from one or more devices, and from which data is sent to one or more devices.

In general, the speech interface device 102 may be capable of capturing utterances with a microphone(s) 108, and responding in various ways, such as by outputting content via an output device(s) 110, which may be a speaker(s), a display(s), or any other suitable output device 110. In addition, the speech interface device 102 may be configured to respond to user speech by controlling second devices that are collocated in the environment with the speech interface device 102, such as by sending a command to a second device via a communications interface 112 (e.g., a short range radio), the command instructing an operation to be performed at the second device (e.g., to turn on/off a light in the environment). FIG. 1 also shows that, in addition to using the microphone(s) 108 to capture utterances and convert them into digital audio data 114, the speech interface device 102 may additionally, or alternatively, receive audio data 114 (e.g., via the communications interface 112) from another speech interface device 106 in the environment, such as when the other speech interface device 106 captures an utterance from the user 104 and sends the audio data 114 to the speech interface device 102. This may occur in situations where the other speech interface device 106 is closer to the user 104 and would like to leverage the "hybrid" capabilities of the speech interface device 102.

Under normal conditions, the speech interface device 102 may operate in conjunction with and/or under the control of a remote, network-based or network-accessible control system 116 (abbreviated to "remote system" 116 in FIG. 1). The remote system 116 may, in some instances be part of a network-accessible computing platform that is maintained and accessible via a wide area network 118. Network-accessible computing platforms such as this may be referred to using terms such as "on-demand computing", "software as a service (SaaS)", "platform computing", "network-accessible platform", "cloud services", "data centers", and so forth. The remote system 116 may be configured to provide particular functionality to large numbers of local (e.g., in-home, in-car, etc.) devices of different users. The wide area network 118 is representative of any type of public or private, wide-area network, such as the Internet, which extends beyond the environment of the speech interface device 102. Thus, the wide area network 118 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

The term "local" is used herein as an adjective that describes a common attribute of devices, components, processing operations, and resources (e.g., computing resources, such as processing resources, memory resources, networking resources, etc.). As used herein, a "local" device, component, processing operation, and/or resource can be one that is located, or performed, in the environment of the speech interface device 102. By contrast, a device, component, processing operation, and/or resource that is located, or performed, at a geographically remote location, such as the geographically remote location of the remote system 116, is not considered to be a "local" device, component, processing operation, and/or resource. Thus, a "local" component may be a physical, logical and/or functional component of the speech interface device 102 itself, or a physical, logical and/or functional component that is located in the environment of the speech interface device 102 and is in communication (e.g., in short-range wired or wireless communication) with the speech interface device 102. A contrasting example is a component of a server that is located at a geographically remote location and is part of the remote system 116; such a component is not considered a "local" component, as the term "local" is used herein. A "local" device can be a device that is located in the environment of the speech interface device 102. For instance, the second speech interface device 106 shown in FIG. 1 is an example of a local device. Similarly, a pair of electronic ear buds that are worn by the user 104 in the vicinity of (e.g., less than a threshold distance from) the speech interface device 102, or a mobile phone carried by the user 104 in the vicinity of the speech interface device 102, are each considered to be an example of a "local" device. When processing operations are described herein as being performed "locally," this means that they are performed at least in part by the speech interface device 102 and/or a component thereof. However, this does not preclude the possibility that another local component and/or device that is located in the environment of the speech interface device 102 may perform some of those "locally-performed" processing operations using its own resources, and/or using the resources of the speech interface device 102. In some embodiments, "local" processing operations are operations performed exclusively by the speech interface device 102. In some embodiments, a "local" device means exclusively the speech interface device 102 and does not include devices that are external or peripheral to the speech interface device 102. That is, local processing may comprise processing that is done within a common environment but across multiple collocated devices, while in other instances local processing may be done within a single device.

In some embodiments, the remote system 116 may be configured to receive audio data 114 from the speech interface device 102, to recognize speech in the received audio data 114 using a remote speech processing system 120, and to perform functions in response to the recognized speech. In some embodiments, these functions involve sending directives, from the remote system 116, to the speech interface device 102 to cause the speech interface device 102 to perform an action, such as output an audible response to the user speech via a speaker(s) (i.e., an output device(s) 110), and/or control second devices in the environment by sending a control command via the communications interface 112. Thus, under normal conditions, when the speech interface device 102 is able to communicate with the remote system 116 over a wide area network 118 (e.g., the Internet), some or all of the functions capable of being performed by the remote system 116 may be performed by sending a directive(s) over the wide area network 118 to the speech interface device 102, which, in turn, may process the directive(s) for performing an action(s). For example, the remote system 116, via a remote directive that is included in remote response data, may instruct the speech interface device 102 to output an audible response (e.g., using text-to-speech (TTS)) to a user's question, to output content (e.g., music) via a speaker of the speech interface device 102, and/or to turn on/off a light in the environment. It is to be appreciated that the remote system 116 may be configured to provide other functions in addition to those discussed herein, such as, without limitation, providing step-by-step directions for navigating from an origin to a destination location, conducting an electronic commerce transaction on behalf of the user 104 as part of a shopping function, establishing a communication session between the user 104 and another user, and so on.

A home automation example is shown in FIG. 1 by the user 104 uttering the expression "Alexa, turn off the kitchen lights." Whether this utterance is captured by the microphone(s) 108 of the speech interface device 102 or captured by another speech interface device 106 in the environment, the audio data 114 representing this user's speech is ultimately received by a wakeword engine 119 of a voice services component 124 executing on the speech interface device 102. The wakeword engine 119 may be configured to compare the audio data 114 to stored models used to detect a wakeword (e.g., "Alexa") that indicates to the speech interface device 102 that the audio data 114 is to be processed for determining an intent (a local NLU result). Thus, the wakeword engine 119 is configured to determine whether a wakeword is detected in the audio data 114, and, if a wakeword is detected, the wakeword engine 119 can proceed with routing the audio data 114 to an audio front end (AFE) 121 of the voice services component 124. If a wakeword is not detected in the audio data 114, the wakeword engine 119 can refrain from sending the audio data 114 to the AFE 121, thereby preventing the audio data 114 from being further processed. The audio data 114 can be discarded in this situation.

In some embodiments, the wakeword engine 119 may include an acoustic event detector (AED) 117. The AED 117 may be configured to compare the audio data 114 to stored models used to detect an acoustic or audio event that indicates to the speech interface device 102 that the audio data 114 is to be processed for determining an intent for the detected audio event. An example of an audio event might be the sound of a hand clap, the sound of breaking glass, the sound of a baby crying, or the like, that is detected in the audio data 114. In other words, the AED 117 is configured to detect non-speech events in the audio data 114.

The AFE 121 (sometimes referred to as acoustic front end (AFE) 121) of a voice services component 124 executing on the speech interface device 102. The AFE 121 is configured to transform the audio data 114 from the wakeword engine 119 into data for processing by the ASR component 140 and/or the NLU component 142. The AFE 121 may reduce noise in the audio data 114 and divide the digitized audio data 114 into frames representing a time intervals for which the AFE 121 determines a number of values, called features, representing the qualities of the audio data 114, along with a set of those values, called a feature vector, representing the features/qualities of the audio data 114 within the frame. Many different features may be determined, and each feature represents some quality of the audio data 114 that may be useful for ASR processing and/or NLU processing. A number of approaches may be used by the AFE 121 to process the audio data 114, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 121 is configured to use beamforming data to process the received audio data 114. Beamforming can be used to distinguish between the directions from which speech and noise originate. Accordingly, the microphones 108 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 114, used by the AFE 121 in beamforming, may be determined based on results of the wakeword engine's 119 processing of the audio data 114. For example, the wakeword engine 119 may detect the wakeword in the audio data 114 from a first microphone 108 at time, t, while detecting the wakeword in the audio data 114 from a second microphone 108 a millisecond later in time (e.g., time, t+1 millisecond), and so on and so forth, for any suitable number of audio signals corresponding to multiple microphones 108 in a microphone array.

A speech interaction manager (SIM) 122 of the voice services component 124 may receive the audio data 114 that has been processed by the AFE 121. The SIM 122 may manage received audio data 114 by processing utterances as events, and the SIM 122 may also manage the processing of directives that are used to respond to the user speech (e.g., by controlling the action(s) of the speech interface device 102). The SIM 122 may include one or more client applications 126 or skills for performing various functions at the speech interface device 102.

A hybrid request selector 128 (or, hybrid request selector component 128) of the speech interface device 102 is shown as including a hybrid proxy (HP) 130 (or, hybrid proxy (HP) subcomponent 130), among other subcomponents. The HP 130 can be implemented as a layer within the voice services component 124 that is located between the SIM 122 and a speech communication library (SCL) 132, and may be configured to proxy traffic to/from the remote system 116. For example, the HP 130 may be configured to pass messages between the SIM 122 and the SCL 132 (such as by passing events and directives there between), and to send messages to/from a hybrid execution controller (HEC) 134 (or, hybrid execution controller (HEC) subcomponent 134) of the hybrid request selector 128. For instance, directive data received from the remote system 116 can be sent to the HEC 134 using the HP 130, which sits in the path between the SCL 132 and the SIM 122. The HP 130 may also be configured to allow audio data 114 received from the SIM 122 to pass through to the remote speech processing system 120 (via the SCL 132) while also receiving (e.g., intercepting) this audio data 114 and sending the received audio data to the HEC 134 (sometimes via an additional SCL).

A local speech processing component 136 (sometimes referred to as a "speech processing component" 136, or a "spoken language understanding (SLU) component" 136) is configured to process audio data 114 representing user speech. In some embodiments, the hybrid request selector 128 may further include a local request orchestrator (LRO) 138 (or, local request orchestrator (LRO) subcomponent) of the hybrid request selector 128. The LRO 138 is configured to notify the local speech processing component 136 about the availability of new audio data 114 that represents user speech, and to otherwise initiate the operations of the local speech processing component 136 when new audio data 114 becomes available. In general, the hybrid request selector 128 may control the execution of the local speech processing component 136, such as by sending "execute" and "terminate" events/instructions to the local speech processing component 136. An "execute" event may instruct the local speech processing component 136 to continue any suspended execution based on audio data 114 (e.g., by instructing the local speech processing component 136 to execute on a previously-determined intent in order to generate a directive). Meanwhile, a "terminate" event may instruct the local speech processing component 136 to terminate further execution based on the audio data 114, such as when the speech interface device 102 receives directive data from the remote system 116 and chooses to use that remotely-generated directive data.

In the example of FIG. 1, where the user 104 utters the expression "Alexa, turn off the kitchen lights," the audio data 114 is received by the SIM 122 of the voice services component 124. The SIM 122 may send the audio data 114 through the HP 130, and the HP 130 may allow the audio data 114 to pass through to the remote speech processing system 120 via the SCL 132, and the HP 130 may also input the audio data 114 to the local speech processing component 136 by routing the audio data 114 through the HEC 134 of the hybrid request selector 128, whereby the LRO 138 notifies the local speech processing component 136 of the incoming audio data 114. At this point, the hybrid request selector 128 may wait for response data from either or both of the remote system 116 or the local speech processing component 136.

The local speech processing component 136 is configured to receive the audio data 114 from the hybrid request selector 128 as input, to recognize speech in the audio data 114, to determine user intent from the recognized speech, and to determine how to act on the user intent by generating directive data. In some cases, a directive may include a description of the intent (e.g., an intent to turn off {device A}). In some cases, a directive may include (e.g., encode) an identifier of a second device(s), such as the kitchen lights, and an operation to be performed at the second device. Directive data that is generated by the local speech processing component 136 (and/or the remote speech processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the wide area network 118. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

In some embodiments, the speech interface device 102 may be configured to compare the audio data 114 to stored models used to detect a wakeword (e.g., "Alexa") that indicates to the speech interface device 102 that the audio data 114 is to be processed for determining a local NLU result (e.g., slot data that corresponds to a named entity, label data, and/or intent data, etc.). In some embodiments, the hybrid request selector 128 may send the audio data 114 to a wakeword engine (See FIG. 6), which determines whether a wakeword is detected in the audio data 114, and, if a wakeword is detected, this indication may be provided to the hybrid request selector 128 so that the hybrid request selector 128 can proceed with routing the audio data 114 to the remote speech processing system 120 while the local speech processing component 136 processes the audio data 114 in parallel. If a wakeword is not detected in the audio data 114, this indication may be provided to the hybrid request selector 128 so that the hybrid request selector 128 can refrain from sending the audio data 114 to the remote speech processing system 120, and to prevent the local speech processing component 136 from further processing the audio data 114, which does not include the wakeword. The audio data 114 can be discarded in this situation.

The local speech processing component 136 may include an ASR component 140 (or, ASR subcomponent 140) that is configured to perform ASR processing on the audio data 114 to convert the audio data 114 into text data (sometimes referred to herein as "ASR text data," an "ASR result", or "ASR data"). ASR transcribes audio data 114 into text data representing the words of the user speech contained in the audio data 114. A spoken utterance in the audio data 114 can be input to the ASR component 140, which then interprets the utterance based on the similarity between the utterance and pre-established language models available to the local speech processing component 136. For example, the ASR component 140 may compare the input audio data 114 with models for sounds (e.g., subword units or phonemes) and sequences of sounds to identify words that match the sequence of sounds spoken in the utterance of the audio data 114. In some embodiments, the ASR component 140 outputs the most likely text recognized in the audio data 114, or multiple hypotheses in the form of a lattice or an N-best list with individual hypotheses corresponding to confidence scores or other scores (such as probability scores, etc.). In some embodiments, the ASR component 140 is customized to the user 104 (or multiple users) who created a user account to which the speech interface device 102 is registered. For instance, the language models (and other data) used by the ASR component 140 may be based on known information (e.g., preferences) of the user 104, and/or on a history of previous interactions with the user 104.

As mentioned, the local speech processing component 136 may also, or alternatively, include a NLU component 142 (or, NLU subcomponent 142) that performs NLU processing on the generated ASR text data to determine a NLU result (sometimes referred to herein as "NLU data"). In some embodiments, the NLU component 142 may be configured to receive the audio data 114 as input and to determine the NLU result (or NLU data) based on the input audio data 114. In this scenario, the local speech processing component 136 may omit or bypass the ASR component 140. A NLU result for a given domain may include intent data, and/or slot data, and/or label data, and directives may be determined based on the intent data and/or the slot data and/or the label data. Generally, the NLU component 142 takes textual input (such as text data generated by the ASR component 140) and attempts to make a semantic interpretation of the ASR text data. In some embodiments, the ASR text data includes, without limitation, text-based features—such as words, pseudowords, etc.—which can be extracted from the ASR text. The NLU component 142 is configured to determine the meaning behind the ASR text based on the text-based features (e.g., individual words) in the ASR text, and then the NLU component 142 can implement that meaning. The NLU component 142 interprets a text string to derive an intent or a desired action or operation from the user 104. The NLU component 142 can also derive pertinent pieces of information in the ASR text that allow the NLU component 142 to identify a named entity (e.g., a second device in the environment, if the user, for example, intends to control a second device, such as a light(s) in the user's 104 house, as is the case in the example of FIG. 1). The local speech processing component 136 may also provide a dialog management function to engage in speech dialogue with the user 104 to determine (e.g., clarify) user intents by asking the user 104 for information using speech prompts. In some embodiments, the NLU component 142 is customized to the user 104 (or multiple users) who created a user account to which the speech interface device 102 is registered. For instance, data used by the NLU component 142 to understand the meaning of ASR text may be based on known information (e.g., preferences) of the user 104, and/or on a history of previous interactions with the user 104.

In some embodiments, the NLU component 142, among other subcomponents of the local speech processing component 136, may utilize "artifacts." An "artifact," as used herein, means compiled data that is executable by one or more subcomponents of the local speech processing component 136 when responding to user speech. Examples of artifacts include, without limitation, ASR models (e.g., acoustic models, language models, etc.) utilized by the ASR component 140 to generate ASR text data, NLU models (e.g., grammar models, named entity recognition (NER) models, intent classification (IC) models), and/or similar data, such as lexical data, including association data that associates names of entities with canonical identifiers of those entities, etc. In some embodiments, the compiled form of an artifact includes a finite state transducer (FST) that is usable, by one or more subcomponents of the local speech processing component 136, to process user speech. A FST may include a compressed graph structure that relates to words and/or phrases (e.g., names of entities, expressions of intent, etc.).

In order to generate a particular interpreted response, the NLU component 142 may be configured to input data to various machine learning models. For example, the NLU component 142 may include a domain classifier component 144 that is configured to use one or more domain classifiers 146 (a machine learning model(s) stored in memory of the speech interface device 102) to generate domain classifier scores associated with a set of candidate domains. In some embodiments, multiple domain classifiers 146 are stored in memory of the speech interface device 102, each domain classifier 146 corresponding to one of multiple domains such that a given domain classifier 146 is configured to generate a domain classifier score for a particular domain, which relates to that domain's probability of being able to handle the input data, such as the ASR text (e.g., being capable of generating a relevant NLU result).

A domain may refer to a grouping of related functionality provided by a system post-NLU processing. In some embodiments, a domain may include a set of instructions (or code) that are executable to process NLU data (e.g., intent data, slot data, etc.) as input, and to output a command (sometimes referred to as a directive) to cause the speech interface device 102 to perform an action. The set of instructions that make up a domain may include a set of rules, a machine learning model(s), or any other suitable type of computer-executable code. In this sense, domains are usable in order to determine how to act on an utterance in a particular way, such as by outputting a directive that corresponds to the determined intent, and which can be processed to implement the desired operation. The domains that are locally available on the speech interface device 102 may include, without limitation, a music domain to act on utterances with intents to play music on a device, such as via a speaker(s) of the speech interface device 102, a navigation domain to act on utterances with intents to get directions to a point of interest with a known address, a shopping domain to act on utterances with intents to buy an item from an electronic marketplace, a communication domain to act on utterances with intents to communicate with other users via the speech interface device or another local device (e.g., a phone), and/or a device control (or home automation) domain to act on utterances with intents to control a second device(s) in the environment. In NLU processing, a domain may represent a discrete set of activities having a common theme, and a user 104 may request performance of such activities by providing speech to a speech interface device 102.

FIG. 1 also shows domain-specific NLU models 148 (machine learning models) stored in memory of the speech interface device 102, which may have been downloaded from the remote system 116 at some earlier point in time (the domain classifier(s) 146 may have also been downloaded from the remote system 116). As the name implies, the domain-specific NLU models 148 are each specific to a particular domain. For example, one or more first domain-specific NLU models 148—e.g., a "Domain 1 NER model" 148(A)(1) and a "Domain 1 IC model" 148(B)(1)—may correspond to a music domain to act on utterances with intents to play music, one or more second domain-specific NLU models 148—e.g., a "Domain 2 NER model" 148(A)(2) and a "Domain 2 IC model" 148(B)(2)—may correspond to a navigation domain to act on utterances with intents to get directions to a point of interest with a known address, one or more third domain-specific NLU models 148—e.g., a "Domain 3 NER model" 148(A)(3) and a "Domain 3 IC model" 148(B)(3)—may correspond to a shopping domain to act on utterances with intents to buy an item from an electronic marketplace or add an item to a shopping list, and/or one or more fourth domain-specific NLU models 148—e.g., a "Domain 4 NER model" 148(A)(4) and a "Domain 1 IC model" 148(B)(4)—may correspond to a device control (or home automation) domain to act on utterances with intents to control a second device(s) in the environment of the speech interface device 102, and so on. Of course, any suitable number of domain-specific NLU models 148 corresponding to any suitable number of domains can be stored on the speech interface device 102, the number constrained by the available memory of the speech interface device 102. Furthermore, the types/names of the domains described herein are merely example types/names of domains that may be available to the speech interface device 102, and other domain types/names can be utilized for local speech processing to cater to different intents. It is to be appreciated that the remote speech processing system 120—which, from a practical standpoint, is not resource-constrained—may maintain additional NLU models for making a larger set of domains available to the remote speech processing system 120. However, since resources (e.g., memory resources) of the speech interface device 102 are more limited, as compared to the resources available to the remote speech processing system 120, the number of domains available for local speech processing may be more limited, as compared to the domains available to the remote speech processing system 120.

The domain classifier(s) 146 and the domain-specific NLU models 148 may represent trained machine learning models that have been downloaded as "artifacts" to the speech interface device 102 for execution thereon. Machine learning generally involves processing a set of examples (called "training data") in order to train a machine learning model(s). A machine learning model(s), once trained, is a learned mechanism that can receive new data as input and estimate or predict a result as output. For example, a trained machine learning model can comprise a classifier that is tasked with classifying unknown input (e.g., an unknown image) as one of multiple class labels (e.g., labeling the image as a cat or a dog). In some cases, a trained machine learning model is configured to implement a multi-label classification task (e.g., labeling images as "cat," "dog," "duck," "penguin," and so on). Additionally, or alternatively, a trained machine learning model can be trained to infer a probability, or a set of probabilities, for a classification task based on unknown data received as input.

In the context of the present disclosure, the domain classifier component 144 of the NLU component 142 may be configured to provide, to the domain classifier(s) 146, unknown input in the form of ASR text data (e.g., text data generated by the ASR component 140, which may include text-based features such as words, pseudowords, etc.), and the domain classifier(s) 146 may be tasked with outputting one or more domain classifier scores associated with multiple candidate domains. An individual domain classifier score may indicate, or otherwise relate to, a probability of a corresponding domain being capable of generating a relevant NLU result based on the ASR text data. For instance, the domain classifier score generated for a device control domain may relate to a probability of the device control domain being capable of generating a relevant NLU result based on the ASR text data. In some embodiments, a domain classifier score that is output by the domain classifier 146 is a variable that is normalized in the range of [0,1], where a score of 1 might indicate a candidate domain with a high probability of being able to handle the ASR text data, and a score of 0 might indicate a candidate domain with a low probability of being able to handle the ASR text data. Said another way, the domain classifier(s) 146 may output a set of probabilities (e.g., one, two, or more probabilities), or scores relating thereto, where a first probability (or score) relates to the probability of the ASR text being "classified" as a first class label (e.g., a first candidate domain), a second probability (or score) relates to the probability of the ASR text being "classified" as a second class label (e.g., a second candidate domain), and so on, for any number of candidate domains. In some embodiments, a single, multi-class domain classifier 146 may receive ASR text data as input to generate, as output, multiple domain classifier scores associated with multiple candidate domains. In some embodiments, multiple domain classifiers 146(1), 146(2), etc., may be built (or otherwise trained) to generate a domain classifier score that is specific to a candidate domain.

In general, a trained machine learning model, as discussed herein, may represent a single model or an ensemble of base-level machine learning models, and may be implemented as any type of machine learning model. For example, suitable machine learning models for use with the techniques and systems described herein include, without limitation, conditional random field (CRF) models, maximum entropy models, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble As shown in FIG. 1, the NLU component 142 may include a recognizer(s) 150 that includes a named entity recognition (NER) component 152, and an intent classification (IC) component 154. Because NER processing and IC processing are computationally-intensive tasks, the NLU component 142 may be configured to optimize the utilization of local resources of the speech interface device 102 during such NLU processing by selectively evaluating NLU results produced by the recognizer(s) 150. That is, the recognizer(s) 150 can individually run the domain-specific NLU models 148 (instead of running all of them in parallel) to conserve local resources during NLU processing. The selective evaluation approaches described herein may be based at least in part on the domain classifier scores determined from output of the domain classifier(s) 146.

In some embodiments, the domain classifier component 144 may determine domain classifier scores associated with multiple candidate domains, and these domain classifier scores can be compared to determine which domains to evaluate, and/or an order of priority in which to evaluate the domains sequentially. For example, a candidate domain that was assigned the highest domain classifier score may be selected for performing NER processing and IC processing exclusively with respect to that highest scoring domain. In some embodiments, this may involve ignoring the other candidate domains by refraining from running NER processing and IC processing for the other candidate domains that were assigned lower domain classifier scores. For example, if the ASR text is "turn off the kitchen lights," the domain classifier component 144 may determine that a device control (or home automation) domain was assigned the highest domain classifier score, and, as a result, the recognizer 150 may conduct NER processing and IC processing exclusively with respect to the device control domain, while ignoring the lower scoring domains in order to provide performance gains by conserving resources. The respective functionalities of the NER component 152 and the IC component 154 are now described with respect to the running example where the highest scoring domain (e.g., the device control domain) was selected for further evaluation of its NLU result.

The NER component 152 may be configured to identify portions of ASR text that correspond to a named entity that may be recognizable by the system. A downstream process called named entity resolution actually links a text portion to an actual entity known to the speech interface device 102. To perform named entity resolution, the speech interface device 102 may utilize gazetteer information stored in memory of the speech interface device 102. The gazetteer information may be used for entity resolution, for example matching ASR results (e.g., text data) with different entities (such as song titles, artist names, contact names, device names (e.g., natural language names for devices), etc.) Gazetteers may be personalized to users (for example, a particular gazetteer may be associated with a specific user's 104 music collection), may be linked to certain domains (such as music, shopping, device control, etc.), or may be organized in a variety of other ways. In some embodiments, each domain available to the speech interface device 102 for local speech processing may be associated with a particular recognizer 150, language model and/or grammar database, a particular set of intents/actions, and a particular personalized lexicon. For example, the NLU component 142 may utilize a multi-domain architecture that includes multiple domains for intents/commands, such as music, video, books, and information, and a plurality of domain recognizers 150, where each domain may include its own recognizer 150. Each recognizer 150 may include various NLU components such as an NER component 152, IC component 154, and possibly other components such as an entity resolver. Each gazetteer may include domain-indexed lexical information associated with a particular user and/or device. For example, a first gazetteer may include domain-index lexical information. A user's music-domain lexical information might include named entities such as album titles, artist names, and song names, for example, whereas a user's contact-list lexical information might include named entities such as the names of contacts. Since every user's music collection and contact list is presumably different, this personalized information improves entity resolution (i.e., identification of named entities from spoken utterances. In the running example, a user's device control-domain lexical information might include named entities such as the names of devices (e.g., a group of lights named "kitchen lights").

In NLU processing, ASR text may be processed by applying rules, models, and information applicable to a particular domain. In a multi-domain NLU architecture, each domain may include a set of intents and entity slots that define a larger concept such as music, books etc. Each domain may also have corresponding trained machine learning models, such as the domain-specific NLU models 148 used to perform various NLU operations such as NER, IC, or the like. These may be constructed and trained separately (e.g., at the remote system 116) and then downloaded to the speech interface device 102 to provide the local NLU component 142 with local access to the domain-specific NLU models 148 during runtime. In some embodiments, each domain may have specially configured components to perform various steps of the NLU operations.

For example, a device control domain recognizer 150 (first domain) may have an NER component 152 that identifies what slots (i.e., portions of ASR text data) may correspond to particular words relevant to the device control domain. The words may correspond to entities such as (for the device control domain) a device, device groups, zones or areas of the environment, etc. The NER component 152 may use a domain-specific NER model 148(A)(1) to identify the portions of ASR text corresponding to a named entity as well as identify what type of entity corresponds to the portions of ASR text. The domain-specific NER model 148(A)(1) may include, for example, a domain-specific conditional random field (CRF). However, other types of machine learning models are possible for use as the domain-specific NER models 148(A), such as a domain-specific hidden Markov model, a domain-specific maximum entropy model, a domain-specific log linear model, and the like. In some embodiments, the domain-specific NER model 148(A)(1) includes, without limitation, one or more domain-specific grammar models usable to recognize one or more entities in the ASR text. It is to be appreciated that the NER component 152 may also use domain-specific lexical information for recognizing one or more entities in the ASR text. In an illustrative example, for the ASR text data "turn off the kitchen lights," the NER component 152 may utilize a NER model 148(A)(1) trained for a device control domain to recognize that the portion of ASR text [the kitchen lights] corresponds to a named entity (or entities).

As mentioned, the NER component 152 use the domain-specific NER model 148(A)(1) to generate slot data identifying "slots" (i.e., particular words in the ASR text) that may be used for later command processing. The NER component 152 may also use the domain-specific NER model 148(A)(1) to generate label data to label each slot with a type of varying levels of specificity (such as noun, place, city, artist name, song name, device name, or the like). This labeling may include semantic tagging, which is the labeling of a word or combination of words according to their type/semantic meaning. The NER component 152 may parse and tag the ASR text as {Verb}: "turn off," {Object}: "lights," and {Object Modifier}: "kitchen." Parsing of ASR text may be performed using heuristic grammar rules, or any suitable domain-specific NER model 148(A)(1). A domain-specific NER model 148(A)(1) may include the names of entities (i.e., nouns) commonly found in speech about the particular domain (i.e., generic terms). The NER component 152 may additionally, or alternatively, use lexical information from a domain-specific gazetteer that is personalized to the user(s) and/or the speech interface device 102. For instance, a NER model 148(A)(1) (e.g., a grammar model) associated with the device control domain may include a database of words commonly used when people try to control devices in their home or their car using voice commands. The output of a domain-specific NER model 148(A)(1) may be referred to herein as a NER result, which may include, without limitation, slot data and/or label data, which provides the meaning of "lights," and "kitchen" in that they relate to named entities of the device control domain.

As mentioned, the recognizer(s) 150 may also include the IC component 154. In some embodiments, the IC component 154 may parse the ASR text, and may also receive, as additional input, at least some of the NER result data output by the NER component 152 (e.g., slot data, label data, etc.) to determine an intent(s) for a particular domain. The intent corresponds to the action to be performed that is responsive to the ASR text. Each domain may be associated with a database of words linked to intents. For example, a device control intent database may link words and phrases such as "turn off," "deactivate," and the like to a "turn off" intent. The IC component 154 may identify potential intents for a given domain by comparing words in the ASR text to the words and phrases in an intents database. The determination of an intent by the IC component 154 may be performed using a set of rules or templates that are processed against the incoming data (e.g., ASR text data, NER output data, etc.) to identify a matching intent.

The IC component 154 is also configured to utilize domain-specific IC models 148(B) to determine the intent associated with ASR text data. The domain-specific IC model 148(B) used to generate intent data may include, for example, a domain-specific maximum entropy model/classifier. However, other types of machine learning models are possible for use as the domain-specific IC models 148(B), such as a domain-specific hidden Markov model, a domain-specific CRF model, a domain-specific log linear model, and the like.

In some embodiments, the intents identified by the IC component 154 can be linked to domain-specific grammar frameworks with "slots" or "fields" to be filled. Each slot/field corresponds to a portion of the ASR text that the NER component 152 believes corresponds to a named entity. For example, if "turn off" is an identified intent, a grammar framework or frameworks may correspond to sentence structures such as "turn off {Device Name}," "turn off {Group Name}," etc. However, to make resolution more flexible, these frameworks would ordinarily not be structured as sentences, but rather based on associating slots with grammatical tags. The output of a domain-specific IC model 148(B) is referred to herein as an IC result, which may include, without limitation, intent data. In the running example, for the ASR text "turn off the kitchen lights," the intent data indicates the intent "turn off" or a similar intent.

Although one might interpret FIG. 1 to imply that NER processing is completed before IC processing is started, the techniques and systems described herein are not limited to performing NER and IC processing in any particular order. For example, the NER component 152 may parse the ASR text to identify words as subject, object, verb, preposition, etc., based on grammar rules and/or domain-specific NER models 148(A), prior to recognizing named entities. The identified verb may be used by the IC component 154 to identify an intent, which may then be used by the NER component 152 to identify frameworks. The frameworks linked to the intent can be used to determine which database fields to search for determining the meaning of these phrases, such as searching a user's gazette for similarity with the framework slots. Accordingly, a framework for the "turn off" intent may specify a list of slots/fields applicable to turn off the identified "object" and any object modifier (e.g., a prepositional phrase), such as {Device Name}, {Group Name}, and {Zone name}. Another framework for the same intent might attempt to resolve the object modifier based on {Group Name}, and resolve the object based on {Device Name} linked to the identified {Group Name}. The NER component 152 may then search the corresponding fields in the domain-specific and personalized lexicon(s), attempting to match words and phrases in the ASR text tagged as a grammatical object or object modifier with those identified in the database(s). If the search of the gazetteer does not resolve the slot/field using gazetteer information, the NER component 152 may search the database of generic words associated with the domain. For instance, if the ASR text was "turn off the kitchen lights," after failing to determine a device name or group name called "kitchen lights," the NER component 152 may search the domain vocabulary for the word "lights." In the alternative, generic words may be checked before the gazetteer information, or both may be tried, potentially producing two different results. In general, the output of the recognizer 150 of a particular domain is a NLU result 156, which may include slot data, label data, and/or intent data. The NLU result 156 may be tagged to attribute meaning to thereto. For instance, the utterance "play song A by Artist_Name" might produce a NLU result for the music domain of: {intent} Play Music, {artist name} "Artist_Name," {media type} SONG, and {song title} "Song A."

Returning to the running example where the NLU component 142 selected the highest scoring candidate domain and performed NER and IC processing for that candidate domain, the domain-specific NER result produced by the NER component 152 and the domain-specific IC result produced by the IC component 154 may be combined to obtain a domain-specific NLU result 156, in this case a NLU result 156 for the device control domain, which might be: {intent} Turn Off, {device name} "Kitchen Lights." Furthermore, a confidence score may be determined and associated with the domain-specific NLU result 156, and this confidence score may be used to determine whether to select the NLU result 156 for use in generating local directive data or not. In some embodiments, confidence scores associated with NLU results may be bucketized into categories like Low, Medium, or High. If, for example, the threshold is set to a Medium confidence score threshold, and the confidence score of the device control domain's NLU result 156 is a Medium or a High confidence score, the NLU result 156 produced by the device control domain may be utilized for responding to the user speech. If, on the other hand, the device control domain produced a NLU result 156 with a Low confidence score, the device control domain's NLU result 156 may be rejected (not used for responding to the user speech).

In some embodiments, a confidence quantizer 158 may be configured to compute a final confidence score as a function of the domain classifier score associated with a given candidate domain and the confidence score associated with the domain-specific NLU result. In other words, the domain classifier score generated as output from a domain classifier 146 may be factored into a final confidence score computed by the confidence quantizer 158, and this final confidence score may be used as a final consideration as to whether the NLU result 156 is "sufficient" or "good enough" for responding to the user speech.

The selective evaluation of individual candidate domains may use other approaches to the above-described approach of selecting a single (e.g., the highest scoring) candidate domain and proceeding exclusively with NLU processing for that single (e.g., highest scoring) domain. For example, the NLU component 142 may be configured to selectively evaluate multiple candidate domains, one candidate domain at a time, and may stop the evaluation early if a "sufficient" NLU result is generated by a domain-specific NLU model(s) 148 corresponding to one of multiple candidate domains. In this case, a "sufficient" NLU result may be one that is associated with an threshold-satisfying confidence score. For example, the NLU component 142 may conduct an evaluation of multiple candidate domains, one candidate domain at a time, in accordance with a ranked order of the domain classifier scores from a highest score to a lowest score. In some embodiments, this may involve comparing the domain classifier scores, and determining which domains to prioritize and which domains to deprioritize based on the domain classifier scores associated with those domains. This evaluation includes inputting input data (e.g., the ASR text data, or the audio data 114) to a domain-specific NLU model(s) 148 that correspond to the candidate domain that is undergoing the evaluation. For example, for input data (e.g., ASR text) representing the utterance "turn on the stones," the device control domain may be assigned a highest domain classifier score, and the music domain may be assigned the next highest domain classifier score, or vice versa. Other domains may also be assigned lower domain classifier scores. This example is one where a "high" score is deemed better than a "low" score, and it is to be appreciated that some implementations may choose to prioritize low-scoring domains over high-scoring domains. Many of the examples described herein are described in the context of prioritizing high-scoring domains over low-scoring domains.

In the example where the device control domain scored the highest, the NLU component 142 may initially conduct the evaluation for the device control domain due to its domain classifier score being the highest among the domain classifier scores associated with the set of candidate domains. For this first round of the evaluation, the NER component 152 may input the input data (e.g., ASR text data) to the domain-specific NER model 148(A)(1) for the device control domain, which may output a NER result (e.g., slot data and label data) for the device control domain, along with a first confidence score. The IC component 154 may also input the input data (e.g., ASR text data, as well as the NER result produced by the NER component 152) to the domain-specific IC model 148(B)(1) for the device control domain, and the domain-specific IC model 148(B)(1) may output an IC result (e.g., intent data) for the device control domain, along with a second confidence score. The NER result and the IC result may be combined to form a NLU result 156 specific to the device control domain, and the first and second confidence scores may be factored into the confidence score for the NLU result 156 for the device control domain. This confidence score may be compared to a threshold confidence score (e.g., a Medium confidence score, a High confidence score, etc.), and if the confidence score of the NLU result 156 for the device control domain satisfies (e.g., meets or exceeds) the threshold confidence score, the evaluation may be stopped. If, on the other hand, the threshold confidence score is not satisfied by the confidence score of the NLU result 156 for the device control domain, the evaluation may continue for the next highest scoring candidate domain. In some embodiments, multiple thresholds can be used, as will be described in more detail below.

In the next round of the evaluation, the NER component 152 may input the input data (e.g., ASR text data) to the domain-specific NER model 148(A)(2) for the music domain, which may output a NER result (e.g., slot data and label data) for the music domain, along with a first confidence score. The IC component 154 may input the input data (e.g., ASR text data, and the NER result) to the domain-specific IC model 148(B)(2) for the music domain, which may output an IC result (e.g., intent data) for the music domain, along with a second confidence score. The NER result and the IC result may be combined to form a NLU result 156 specific to the music domain, and the first and second confidence scores may be factored into the confidence score for the NLU result 156 for the music domain. Consider, for the example where the input data (e.g., ASR text) represents the utterance "turn on the stones," the confidence score for the music domain's NLU result 156 satisfies (e.g., meets or exceeds) the threshold confidence score (e.g., a Medium confidence score, a High confidence score, etc.), but the confidence score for the device control domain's NLU result 156 fails to satisfy (e.g., is less than) the threshold confidence score. In this case, the evaluation is stopped after the second round of the evaluation, and the NLU result 156 for the music domain may be selected as a candidate NLU result for responding to the user speech. Again, other approaches are possible, such as a multiple threshold approach where the NLU result for the device control domain is set aside as a "backup" result until the higher confidence NLU result for the music domain is produced. Furthermore, in these and other examples, the confidence quantizer 158 may compute a final confidence score that is based on multiple confidence scores generated with the various model outputs (e.g., the domain classifier score, the NER confidence score, the IC confidence score, etc.).

As mentioned, in some embodiments, multiple thresholds are used during the round-by-round (one domain at a time) evaluation of multiple candidate domains, which allows for producing an improved NLU result, in some instances, at the cost of an increase in local resource consumption that may be manageable on some speech interface devices 102 without negatively impacting latency. That is, with each round of the evaluation, an individual domain-specific NLU result's 156 confidence score can be compared to a first (e.g., lower) threshold confidence score (e.g., a Low confidence score) and a second (e.g., upper) threshold confidence score (e.g., a High confidence score). If the confidence score for a domain-specific NLU result 156 satisfies the first threshold confidence score, but fails to satisfy the second threshold confidence score (e.g., the confidence score is between the two threshold confidence scores), that NLU result 156 may be set aside for potential use as a backup NLU result, and the evaluation may continue for the next candidate domain (the next round). If a subsequent domain-specific NLU result's 156 confidence score satisfies both the first (e.g., lower) threshold confidence score and the second (e.g., upper) threshold confidence score, the lower-confidence NLU result(s) that was set aside in the earlier round(s) of the evaluation can be ignored, and the higher-confidence NLU result 156 can be selected, whereby the evaluation can be stopped without further processing remaining candidate domains through the NER and IC components in order to conserve resources. If, however, after all rounds of the evaluation have completed, there are no NLU results that satisfy both the first and second threshold confidence scores, the NLU component 142 may select the "best" NLU result from those with confidence scores that satisfy the first threshold confidence score, but not the second threshold confidence score. This may be based on the confidence scores produced during NER and IC processing, or it may be based on a final confidence score computed by the confidence quantizer 158 for each candidate domain under consideration, which may factor in additional scores, such as the domain classifier scores.

In some embodiments, domain classifier scores are generated for multiple candidate domains, and the NLU component 142 may be configured to evaluate the multiple candidate domains to produce multiple corresponding NLU results 156 that are each specific to an individual candidate domain, and the NLU component 142 may select the "best" NLU result from among the multiple NLU results. This may include reverse-scaling the confidence scores for the domain-specific NLU results. That is, if the confidence scores associated with the domain-specific NLU results 156 are provided at a granularity or resolution of Low, Medium, and High buckets or categories, reverse-scaling can be applied to these confidence score buckets to convert those confidence scores to more granular (higher resolution) numerical scores that are comparable amongst each other. For instance, two confidence scores for NLU results of two different candidate domains may both be High confidence scores, but after reverse-scaling these scores using the data that factored into the computation of the "High" confidence scores, a first numerical score associated with the first candidate domain and a second numerical score associated with the second candidate domain may be compared to determine that the first numerical score is different (e.g., higher or lower) than the second numerical score. In this manner, the best (e.g., highest scoring) NLU result can be selected using reverse scaling.

Using any of the approaches described herein, a NLU result 156 can be selected as a candidate NLU result usable to respond to the user speech, and the local speech processing component 136 may send local response data to the hybrid request selector 128, such as a "ReadyToExecute" response, which can indicate that the local speech processing component 136 has recognized an intent. In cases where the NLU component 142 fails to recognize an intent, the local speech processing component 136 may communicate response data to the hybrid request selector 128 that it is ready to communicate failure. The hybrid request selector 128 may then determine whether to use directive data from the local speech processing component 136 to respond to the user speech, or whether to use directive data received from the remote system 116, assuming a remote response is even received (e.g., when the speech interface device 102 is able to access the remote speech processing system 120 over the wide area network 118). In any case, directive data is processed to cause the speech interface device 102 to perform an action, such as outputting audio via one or more speaker(s), controlling one or more second devices in the environment, etc. In the example of FIG. 1, the action may be to send a control signal(s) via the communications interface 112 to one or more lights in the kitchen, which may be configured to receive the control signal and perform the "turn off" operation to turn off the kitchen lights.

Figure 2:
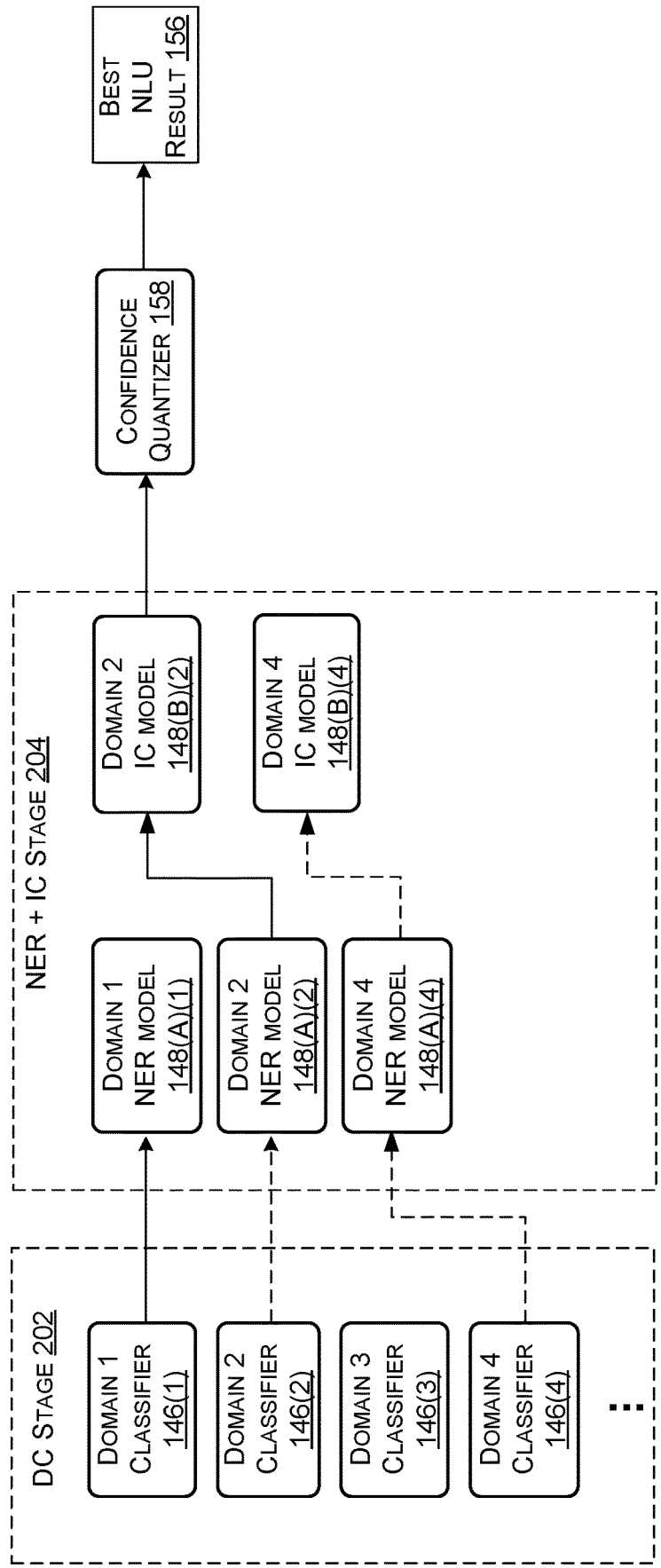
FIG. 2 is a diagram illustrating an example technique for performing local NLU processing using an approach that selectively evaluates NLU results produced by domain-specific NLU models, in part using domain classifier scores assigned to multiple candidate domains.

FIG. 2 is a diagram illustrating an example technique for performing local NLU processing using an approach that selectively evaluates NLU results produced by domain-specific NLU models 148, in part using domain classifier scores assigned to multiple candidate domains. The local NLU processing technique shown in FIG. 2 may be part of a local statistical model pipeline 200 that includes multiple stages, including, without limitation, a domain classifier (DC) stage 202, and a NER+IC stage 204.

During the DC stage 202, multiple candidate domains can be evaluated using one or more domain classifiers 146. For example, the ASR component 140 may have generated ASR text data based on audio data 114 representing user speech (e.g., an utterance "turn off the kitchen lights"), and the domain classifier component 144 may input this ASR text data to a domain classifier(s) 146. As mentioned, the ASR text data can be input to a single, multi-class domain classifier 146 configured to generate, as output, multiple domain classifier scores associated with multiple candidate domains. FIG. 2 shows an example, however, where the ASR text data is input to multiple domain classifiers 146(1), 146(2), 146(3), 146(4), etc. These individual domain classifiers 146 may have been built (or otherwise trained) to generate a domain classifier score that is specific to a candidate domain. In the example of FIG. 2, where multiple domain-specific domain classifiers 146 are utilized, the ASR text data can be input to the multiple domain classifiers 146(1), 146(2), etc., in a sequential manner, which can be in any order. In some embodiments, the ASR text data can be input to the multiple domain classifiers 146(1), 146(2), etc. in parallel. Feature generation (e.g., ASR text data) may benefit from sequentially inputting ASR text data to individual ones of the multiple domain classifiers 146(1), 146(2), etc. because data (e.g., features) can be cached and retrieved for input to subsequent domain classifiers. Inputting the ASR text data to the multiple domain classifiers 146(1), 146(2), etc. in parallel during the DC stage 202 may be useful when there are a large number of candidate domains to evaluate because the cost (in terms of local resource consumption) is relatively low for running ASR text data through each individual domain classifier 146.

In the diagram of FIG. 2, consider a case where a first candidate domain (Domain 1) is assigned a highest domain classifier score, a second candidate domain (Domain 2) is assigned a next highest domain classifier score, a third candidate domain (Domain 3) is assigned a next highest domain classifier score, and a fourth candidate domain (Domain 4) is assigned a next highest domain classifier score, and possibly more domains are assigned lower scores. In other words, the DC stage 202 shown in FIG. 2 might indicate a ranked order of the multiple candidate domains according to their respective domain classifier scores.

There may be an optional pruning step(s) that is performed in the DC stage 202 to eliminate one or more candidate domains from a superset of candidate domains so that the eliminated candidate domain(s) is not further considered in the NER+IC stage 204. An example criterion for pruning candidate domains at the DC stage 202 may be whether a domain classifier 146 generated an out-of-domain (00D) classification based on the ASR text data input to the domain classifier 146. For example, consider a case where a third domain (Domain 3) classifier 146(3) received ASR text data as input, and generated an OOD classification for the third candidate domain, meaning that the third domain (Domain 3) classifier 146(3) predicted that the third candidate domain (Domain 3) is incapable of handling the utterance represented by the ASR text data. In this case, the third candidate domain (Domain 3) may be eliminated from further consideration so that the third candidate domain is not evaluated in the NER+IC stage 204. This might be the case if the ASR text data represents the utterance "turn off the kitchen lights," and the third candidate domain (Domain 3) corresponds to a shopping domain, for example. Another example criterion for pruning candidate domains at the DC stage 202 may be a target domain classifier score (or a target confidence threshold). That is, if a candidate domain is assigned a domain classifier score that fails to satisfy (e.g., is less than) a target domain classifier score, that candidate domain may be eliminated from consideration at the DC stage 202 so that the eliminated candidate domain is not evaluated in the NER+IC stage 204. This is based on the notion that a threshold-dissatisfying domain classifier score is unlikely to produce a relevant NLU result, so local resources can be conserved by refraining from performing further NLU processing for that threshold-dissatisfying candidate domain.

In some embodiments, different target domain classifier scores can be used for each candidate domain. For example, a first domain classifier score assigned to the first candidate domain (Domain 1) can be compared to a first target domain classifier score, while a second domain classifier score assigned to the second candidate domain (Domain 2) can be compared to a second target domain classifier score that is different (e.g., higher or lower) than the first target domain classifier score, and so on. In some embodiments, whether different, domain-specific target domain classifier scores are used for pruning at the DC stage 202 is based on the spoken language (e.g., English, Spanish, Japanese, etc.).

In any case, the output of the DC stage 202 is a N-best set of candidate domains and their assigned domain classifier scores, where N can be 0, 1, 2, etc. For instance, if an utterance is ASR processed into text data that produces an out-of-domain (OOD) classification for every candidate domain, the output at the DC stage 202 may be zero candidate domains (N=0), or possibly domain classifier scores of zero for all candidate domains. In some cases, there may be a single candidate domain that is assigned a domain classifier score that satisfies (e.g., meets or exceeds) the target domain classifier score, and/or all domain classifiers 146 except the domain classifier 146 for the single candidate domain produced OOD classifications, resulting in N=1 (e.g., the 1-best domain). In other cases, multiple candidate domains (e.g., N>1) will survive the DC stage 202, which implicates the selective evaluation logic for evaluating each candidate domain, round-by-round, during the NER+IC stage 204.

After the optional pruning step, a selective evaluation can be conducted for the set of candidate domains (which might be a subset of the initial superset of candidate domains as a result of the pruning step(s)). This selective evaluation may be conducted one candidate domain at a time in accordance with the domain classifier scores (e.g., in accordance with a ranked order of the domain classifier scores from a highest score to a lowest score). As noted, although the example of FIG. 2 implies a particular order in the NER+IC stage 204; namely, NER processing is completed before IC processing begins, any order in this NER+IC stage 204 can be implemented. For example, IC processing may be performed (and possibly completed) before NER processing (filtering the results down further). Performing IC processing first may limit the input to the domain-specific IC models 148(B) to only the ASR text data (e.g., the text-based features from the ASR text), rather than having the derived NER results data (e.g., label data) provided as input to the domain-specific IC models 148(B). In some embodiments, NER processing may be started (e.g., to determine a verb(s) in the ASR text), and then IC processing may be performed, and the IC result may influence the NER processing to produce the NER result.

In the example of FIG. 2, input data (e.g., the ASR text data, or the audio data 114) is provided as input to the domain-specific NER models 148(A) of the N-Best candidate domains that come out of the DC stage 202, and then the input data (e.g., ASR text data, or the audio data 114) and the NER result may be provided as input to the domain-specific IC models 148(B) of the N-Best candidate domains. This evaluation in the NER+IC stage 204 can be performed sequentially, one candidate domain at a time, using various run strategies, assuming there is more than one NLU result to choose from. In a first run strategy, each candidate domain of the N-Best candidate domains is run through the NEC+IC stage 204 sequentially in order of decreasing domain classifier score, and, at the transition between each round of the evaluation, the confidence score associated with the domain-specific NLU result 156 produced in a given round is evaluated to determine if the confidence score satisfies (e.g., meets or exceeds) a threshold confidence score (e.g., at least Medium confidence or higher, among three possible confidence score categories: Low, Medium, and High). In this first run strategy, consider a case where the NLU result produced in a first round of the evaluation by running the input data (e.g., ASR text data) through the Domain 1 NER model 148(A)(1) and the Domain 1 IC model 148(B)(1) is associated with a Low confidence score. In this case, the evaluation may proceed to the next round of the evaluation by running the input data (e.g., ASR text data) through the Domain 2 NER model 148(A)(2) and the Domain 2 IC model 148(B)(2). If the NLU result produced in this second round is associated with a Medium or High confidence score, the evaluation can be stopped without running the ASR text through the Domain 4 NLU models 148, and the confidence quantizer 158 can compute a final confidence score for the Domain 2 NLU result 156 to determine whether to select the Domain 2 NLU result 156, and if the final confidence score satisfies (e.g., meets or exceeds) a threshold score, the Domain 2 NLU result 156 is selected as a best NLU result 156, which may be considered for use in responding to the user speech (perhaps against a remote directive received from the remote system 116).

In a second run strategy, each candidate domain of the N-Best candidate domains is run through the NEC+IC stage 204 sequentially in order of decreasing domain classifier score, and, at the transition between each round of the evaluation, the confidence score associated with the domain-specific NLU result 156 produced in a given round is evaluated to determine if the confidence score satisfies one or both of multiple threshold confidence scores. This may involve determining if the confidence score is between a first (lower) threshold confidence score (e.g., Low confidence score) and a second (upper) threshold confidence score (e.g., High confidence score), or whether the confidence score meets or exceeds the second (upper) threshold confidence score (e.g., High confidence score). In this second run strategy, consider a case where the NLU result produced in the first round of the evaluation by running the input data (e.g., ASR text data) through the Domain 1 NER model 148(A)(1) and the Domain 1 IC model 148(B)(1) is associated with a Medium confidence score (e.g., between Low and High). In this case, the NLU result produced in the first round may be set aside, and the evaluation may proceed to the next round of the evaluation by running the input data (e.g., ASR text data) through the Domain 2 NER model 148(A)(2) and the Domain 2 IC model 148(B)(2). If the NLU result produced in this second round is associated with a High confidence score, the evaluation can be stopped without running the input data (e.g., ASR text data) through the Domain 4 NLU models 148, the Medium confidence NLU result that was set aside can be discarded, and the confidence quantizer 158 can compute a final confidence score for the Domain 2 NLU result 156 to determine whether to select the Domain 2 NLU result 156, and if the final confidence score satisfies (e.g., meets or exceeds) a threshold score, the Domain 2 NLU result 156 is selected as a best NLU result 156, which may be considered for use in responding to the user speech (perhaps against a remote directive received from the remote system 116). If, in this second run strategy, the Domain 2 NLU result is associated with a Medium confidence score, the evaluation may proceed to the next round of the evaluation by running the input data (e.g., ASR text data) through the Domain 4 NER model 148(A)(4) and the Domain 4 IC model 148(B)(4), and, assuming the Domain 4 NLU result is associated with a Low or Medium confidence score, and assuming there are no more candidate domains to evaluate in the NER+IC stage 204, the NLU component 142 may select the best NLU result from those Medium confidence NLU results that were set aside during the NER+IC stage 204. In this case, the two Medium confidence scores associated with the Domain 1 and Domain 2 NLU results may be reverse scaled by converting these confidence scores, respectively, to numerical scores that are comparable, and then selecting the NLU result based on the two numerical scores (e.g., selecting the NLU result with the higher of the two numerical scores).

In a third run strategy, each candidate domain of the N-Best candidate domains may run through the NEC+IC stage 204, which may be done sequentially (e.g., in order of decreasing domain classifier score), or in parallel, and then the best NLU result may be selected based on reverse-scaling the confidence scores associated with the respective NLU results for the multiple candidate domains. In the example of FIG. 2, the NER+IC stage 204 may produce NLU results for Domains 1, 2, and 4, and the confidence scores associated with these three NLU results may be reverse-scaled to convert the confidence scores into numerical scores that are comparable, and the best NLU result may be selected based on a comparison of the numerical scores.

FIG. 2 also illustrates how cutoff thresholds can be applied at any stage (or any substage) of the local statistical model pipeline 200. For instance, if the confidence score associated with the Domain 1 NER result fails to satisfy (e.g., is less than) a threshold NER confidence score, further NLU processing with respect to Domain 1 can be stopped. This is shown in the example of FIG. 2 where the input data (e.g., ASR text data) is not input to the Domain 1 IC model 148(B)(1). Instead, the evaluation can proceed to the next round (for Domain 2) after determining that the NER result is a low confidence result and that a subsequent NER result is likely to be better. Furthermore, if all of the previous stages of the local statistical model pipeline 200 return more than one candidate domain, this can return more than one NLU result/interpretation. Additionally, if any domain returned N-best IC results/interpretations, and each of the IC interpretations is associated with a confidence score that satisfies (e.g., is above) a threshold confidence score, these can be expanded to multiple NLU interpretations.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
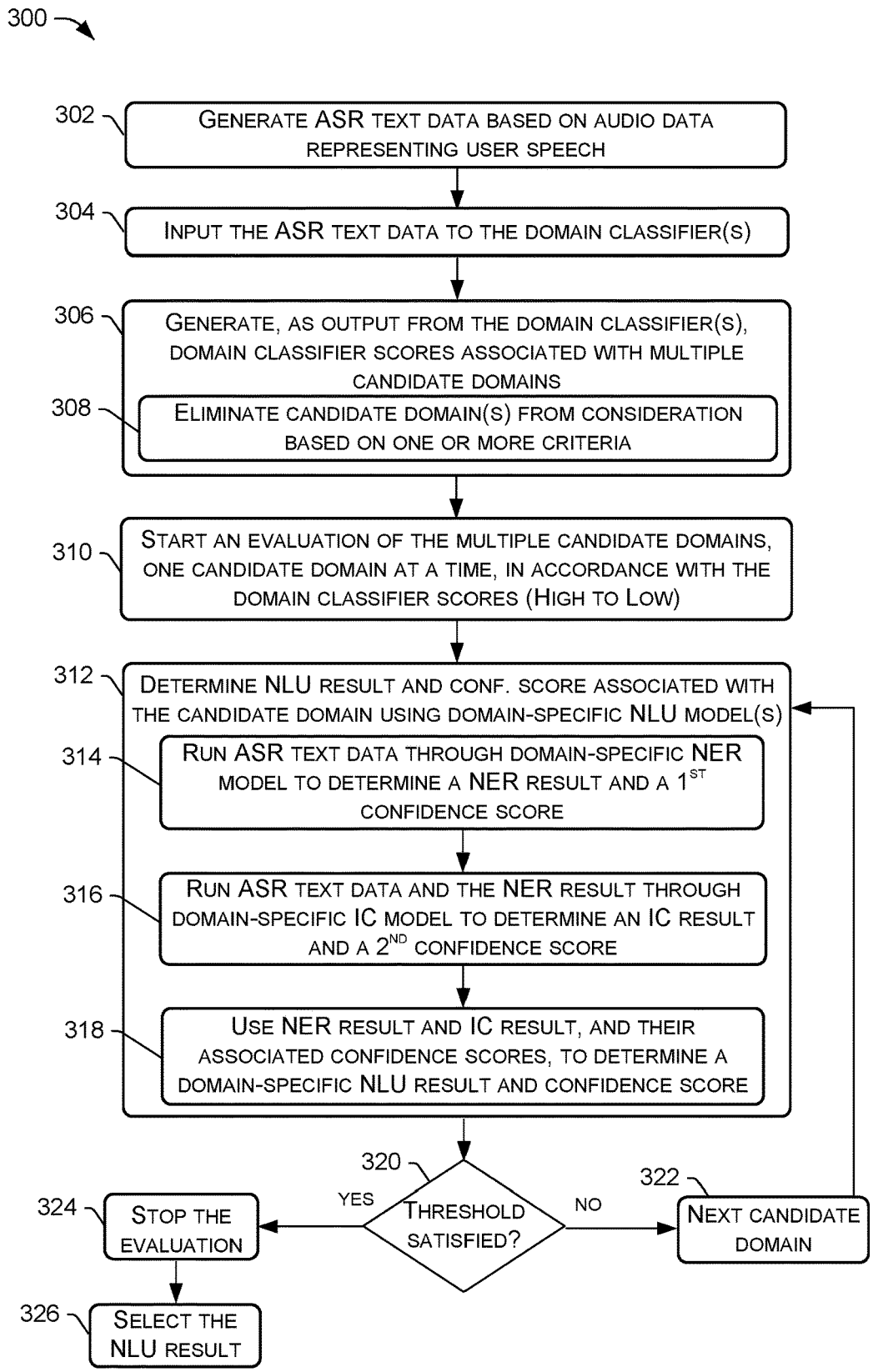
FIG. 3 is a flow diagram of an example process implemented by a speech interface device for performing local NLU processing using an approach that stops an ongoing, sequential evaluation of multiple candidate domains as soon as one of the candidate domains produces a NLU result with an above-threshold confidence score (e.g., a Medium or High confidence score).

FIG. 3 is a flow diagram of an example process 300 implemented by a speech interface device 102 for performing local NLU processing using an approach that stops an ongoing, sequential evaluation of multiple candidate domains as soon as one of the candidate domains produces a NLU result with an above-threshold confidence score (e.g., a Medium or High confidence score). For discussion purposes, the process 300 is described with reference to the previous figures.

At 302, an ASR component 140 executing on a speech interface device 102 may generate text data based at least in part on audio data 114 representing user speech. It is to be appreciated that, prior to the generation of ASR text data at block 302, the speech interface device 102 may have downloaded and stored, in memory of the speech interface device 102, one or more domain classifiers 146, as well as multiple domain-specific NLU models 148 (e.g., multiple domain-specific NER models 148(A), multiple domain-specific IC models 148(B), etc.). These locally-available machine learning models are usable during NLU processing.

At 304, a domain classifier component 144 of an NLU component 142 executing on the speech interface device 102 may input the text data to a domain classifier(s) 146. As noted herein, the ASR text data may be input to multiple domain classifiers 146 at block 304, each associated with a particular domain. In some embodiments, the ASR component 140 may be bypassed, and the audio data 114 may be received directly by the NLU component 142. As such, the domain classifier(s) 146 may receive input data at block 304, where the input data may include the ASR text data, or the audio data 114 in the case where ASR is bypassed.

At 306, the domain classifier(s) 146 may generate, as output, domain classifier scores associated with multiple candidate domains. These scores may relate to the probability of the multiple candidate domains being capable of producing a relevant NLU result for the given ASR text data. For example, a single multi-class domain classifier 146 may generate, as output, a first domain classifier score associated with a first domain, a second domain classifier score associated with a second domain, a third domain classifier score associated with a third domain, and so on, for any suitable number of domains available on-device.

At sub-block 308, one or more candidate domains may be eliminated from consideration. For example, the output of the domain classifier(s) 146 may correspond to a superset of candidate domains (e.g., three domains), and the elimination at sub-block 308 may result in a subset of candidate domains (e.g., two domains) that are further NLU processed. The elimination at sub-block 308 may be based one or more candidate domains generating an out-of-domain (OOD) classification based on the text data, and/or one or more candidate domains having been assigned a domain classifier score that fails to satisfy (e.g., is less than) a target domain classifier score. For example, if a third domain generates a OOD classification or is assigned a third domain classifier score that fails to satisfy the target domain classifier score, this third domain may be eliminated from consideration at sub-block 308.

At 310, the NLU component 142 of the speech interface device 102 may start conducting an evaluation of the multiple candidate domains, one candidate domain at a time, in accordance with the domain classifier scores (e.g., in accordance with a ranked order of the domain classifier scores from a highest score to a lowest score). This may involve comparing domain classifier scores to determine which domains to prioritize and which domains to deprioritize. For example, a first domain classifier score associated with a first domain and a second domain classifier score associated with a second domain may be compared, and, based on this comparison of the domain classifier scores, the first domain may be prioritized, and the second domain may be deprioritized.

At 312, as part of the evaluation, the NLU component 142 may determine a domain-specific NLU result 156 associated with the candidate domain undergoing the evaluation using one or more domain-specific NLU models 148 that correspond to the candidate domain undergoing the evaluation. Using the domain-specific NLU models 148 can include inputting the input data (e.g., ASR text data) to the domain-specific NLU model(s) 148, and determining, based at least in part on output from the domain-specific NLU model(s) 148, a domain-specific NLU result 156 associated with the candidate domain undergoing the evaluation, and a confidence score associated with the domain-specific NLU result 156. For example, if, based on a comparison of the domain classifier scores, the first domain is prioritized over other candidate domains, the input data (e.g., ASR text data) may be input to the domain-specific NLU model(s) 148 associated with the first domain, which may output a domain-specific NLU result 156 associated with the first domain, and a confidence score associated with the domain-specific NLU result 156. As shown by sub-blocks 314-318, the determination of the domain-specific NLU result 156 and its associated confidence score may include sub-operations.

At sub-block 314, the NER component 152 executing on the speech interface device 102 may run the input data (e.g., ASR text data) through a domain-specific NER model 148(A) for the candidate domain undergoing the evaluation in the current round. This may involve inputting the input data (e.g., ASR text data) to the domain-specific NER model 148(A) and generating, as output from the domain-specific NER model 148(A), a NER result and a first confidence score associated with the NER result. In the running example, if the first domain was prioritized for evaluation, the input data (e.g., ASR text data) may be input to the domain-specific NER model 148(A) that corresponds to the first domain, which may output a NER result and a first confidence score.

At sub-block 316, the IC component 154 executing on the speech interface device 102 may run the input data (e.g., ASR text data) and the NER result from sub-block 314 through a domain-specific IC model 148(B) for the candidate domain undergoing the evaluation in the current round. This may involve inputting the input data (e.g., ASR text data) and the NER result to the domain-specific IC model 148(B), and generating, as output from the domain-specific IC model 148(B), an IC result and a second confidence score associated with the IC result. In the running example, if the first domain was prioritized for evaluation, the input data (e.g., ASR text data) may be input to the domain-specific IC model 148(B) that corresponds to the first domain, which may output an IC result and a second confidence score.

At sub-block 318, the NLU component 142 may determine a domain-specific NLU result 156 associated with the candidate domain undergoing the evaluation in the current round (e.g., the first domain, if the first domain is prioritized), the NLU result 156 determined based at least in part on the NER result and the IC result. At sub-block 318, the NLU component 142 may also determine a confidence score associated with the domain-specific NLU result 156 based at least in part on the first (NER) confidence score and the second (IC) confidence score.

At 320, a determination may be made as to whether the confidence score associated with the domain-specific NLU result 156 satisfies (e.g., meets or exceeds) a threshold score (e.g., a High threshold confidence score). If, at block 320, the NLU result's 156 confidence score fails to satisfy (e.g., is less than) the threshold score, the process 300 may follow the "NO" route from block 320 to block 322, where the next (e.g., next highest scoring) candidate domain is selected, and the evaluation iterates blocks 312-320 for the next round of the evaluation. For example, if the second domain is next in line for the evaluation, blocks 312-320 iterate with respect to the second domain. If, after any iteration through blocks 312-320, the confidence score associated with the domain-specific NLU result 156 satisfies (e.g., meets or exceeds) the threshold confidence score at block 320, the process 300 may follow the "YES" route from block 320 to block 324.

At 324, the selective evaluation of the multiple candidate domains may be stopped in response to determining, for an individual candidate domain, that the confidence score associated with the domain-specific NLU result 156 satisfies (e.g., meets or exceeds) the threshold score.

At 326, the domain-specific NLU result 156 associated with one of the multiple candidate domains can be selected, based on the confidence score associated with the domain-specific NLU result 156, as a candidate NLU result for use in causing the speech interface device to perform an action. The selected NLU result 156 at block 326 may be the NLU result with a confidence score that satisfied (e.g., met or exceeded) the threshold confidence score at block 320. In some embodiments, the selection at block 326 may include the confidence quantizer 158 computing a final confidence score as a function of at least the domain classifier score associated with the candidate domain and the confidence score associated with the domain-specific NLU result 156 for that candidate domain, and determining that the final confidence score satisfies (e.g., meets or exceeds) a threshold score, which may be a different threshold than the threshold at block 320. In this case, the selection at block 326 is based on the final confidence score satisfying (e.g., meeting or exceeding) a threshold score.

It is to be appreciated that the speech interface device 102 may receive remote directive data from the remote speech processing system 120 as a result of sending the audio data 114 to the remote speech processing system 120 in parallel, and logic (e.g., the hybrid request selector 128) of the speech interface device 102 may select at least one of local directive data (assuming the NLU result selected at block 326 corresponds to a recognized intent) or the remote directive data as selected directive data, and logic of the speech interface device 102 may perform an action based at least in part on the selected directive data. In the running example of FIG. 1, if the selected directive data includes instructions to turn off the kitchen lights, the speech interface device 102 may perform an action by sending, via the communications interface 112, a command to a second device(s) (e.g., smart kitchen lights) collocated in the environment with the speech interface device 102, causing the second device(s) to "turn off."

It is also to be appreciated that the process 300 may be suitable for speech interface devices 102 that are relatively resource-constrained in terms of the available compute and memory resources on the speech interface device 102. The following processes 400 and 500 may be suitable for relatively less resource-constrained devices.

Figure 4:
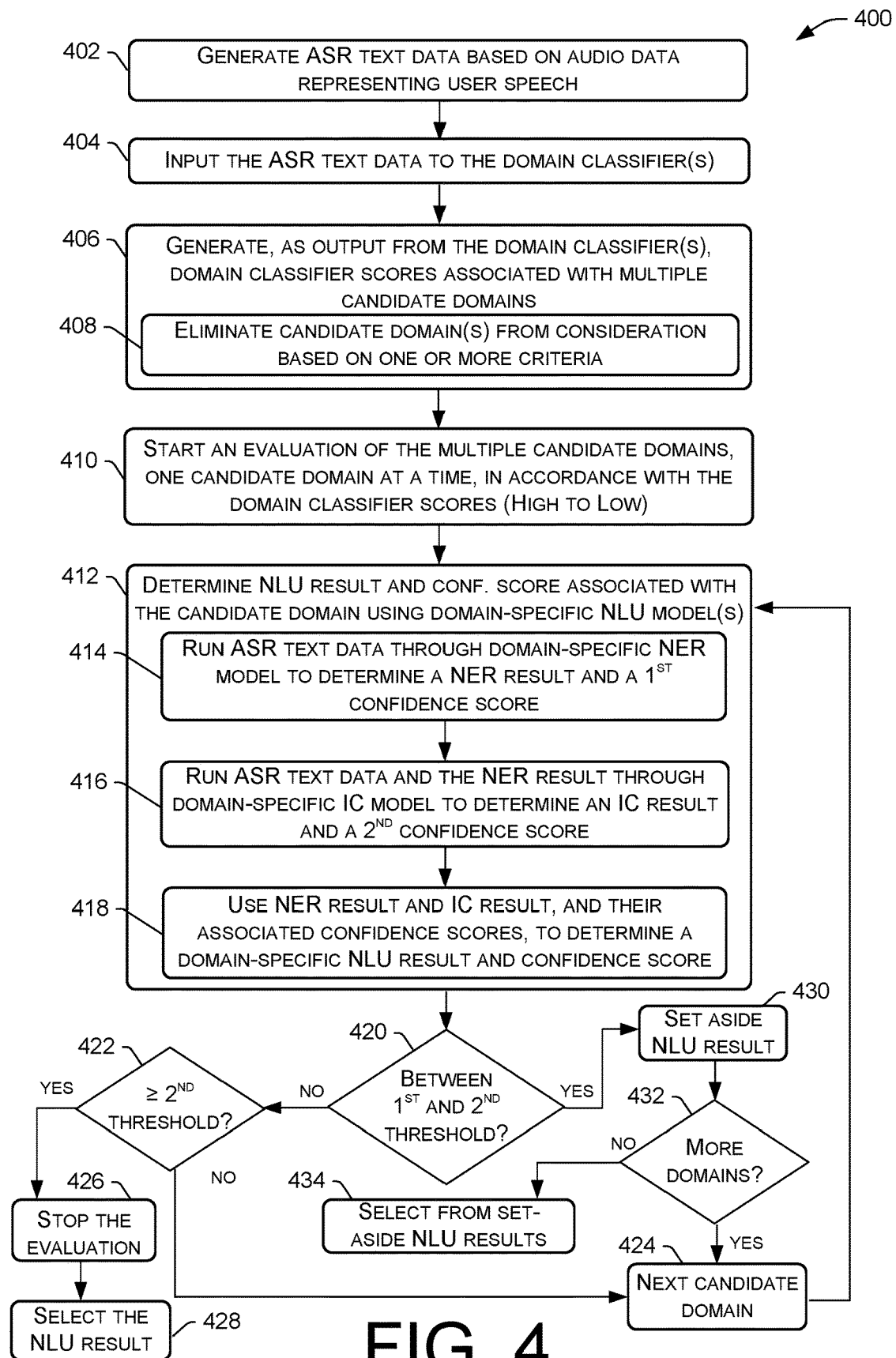
FIG. 4 is a flow diagram of an example process implemented by a speech interface device for performing local NLU processing using an approach that stops an ongoing, sequential evaluation of multiple candidate domains as soon as one of the candidate domains produces a NLU result with an above-threshold confidence score (e.g., High confidence score), else it selects the best NLU result produced with a confidence score above a lower threshold (e.g., above a Low confidence score), if such a NLU result is produced.

FIG. 4 is a flow diagram of an example process 400 implemented by a speech interface device 102 for performing local NLU processing using an approach that stops an ongoing, sequential evaluation of multiple candidate domains as soon as one of the candidate domains produces a NLU result with an above-threshold confidence score (e.g., High confidence score), else it selects the best NLU result produced with a confidence score above a lower threshold (e.g., above a Low confidence score), if such a NLU result is produced. For discussion purposes, the process 400 is described with reference to the previous figures.

Blocks 402-418 may include the same or similar operations to those described with reference to blocks 302-318 of the process 300, and for the sake of brevity, blocks 402-418 will not be described in detail, as the description of blocks 302-318 can be referenced for these blocks of the process 400.

At 420, a determination may be made as to whether the confidence score associated with a domain-specific NLU result 156 determined in the current round of the evaluation is between a first (lower) threshold score (e.g., a Low threshold confidence score) and a second (upper) threshold score (e.g., a High threshold confidence score), which is higher than the first threshold score. If, at block 420, the NLU result's 156 confidence score is not between these two threshold scores, the process 400 may follow the "NO" route from block 320 to block 422.

At 422, a determination may be made as to whether the confidence score associated with the domain-specific NLU result 156 meets or exceeds the second (upper) threshold score (e.g., the High threshold confidence score). If, at block 422, the NLU result's 156 confidence score is less than the second (upper) threshold score, the process 400 may follow the "NO" route from block 422 to block 424, where the next highest scoring candidate domain is selected, and the evaluation iterates blocks 412-420 for the next round of the evaluation. If, at block 422, the confidence score associated with the domain-specific NLU result 156 meets or exceeds the threshold confidence score, the process 400 may follow the "YES" route from block 422 to block 426.

At 426, the selective evaluation of the multiple candidate domains may be stopped in response to determining, for an individual candidate domain, that the confidence score associated with the domain-specific NLU result 156 meets or exceeds the second (upper) threshold score.

At 428, the domain-specific NLU result 156 associated with one of the multiple candidate domains can be selected, based on the confidence score associated with the domain-specific NLU result 156, as a candidate NLU result for use in causing the speech interface device to perform an action. The selected NLU result 156 at block 428 may be the NLU result with a confidence score that met or exceeded the second (upper) threshold confidence score at block 422. In some embodiments, the selection at block 428 may include the confidence quantizer 158 computing a final confidence score as a function of at least the domain classifier score associated with the candidate domain and the confidence score associated with the domain-specific NLU result 156 for that candidate domain, and determining that the final confidence score meets or exceeds a threshold score, which may be a different threshold than the threshold at block 422. In this case, the selection at block 428 is based on the final confidence score meeting or exceeding a threshold score.

If, at block 420, the NLU result's 156 confidence score is between the first and second threshold scores, the process 400 may follow the "YES" route from block 420 to block 430 where the NLU result 156 with the confidence score between the lower and upper thresholds is set aside as a backup option to use for responding to the user speech, and the process 400 proceeds to block 432.

At 432, a determination is made as to whether there are more candidate domains to evaluate, and, if so, the process 400 may follow the "YES" route from block 432 to block 424, where the evaluation proceeds to the next candidate domain (the next round) and the process 400 iterates blocks 412-420 for the next round of the evaluation. If, at 432, there are no more candidate domains to evaluate, meaning it has been determined, for each candidate domain that underwent the evaluation, that the confidence score associated with the domain-specific NLU result did not meet or exceed the second (upper) threshold score, the process 400 may follow the "NO" route from block 432 to block 434.

At 434, the NLU component 142 may select a NLU result associated with a particular domain from the set of NLU results that were set aside at block 430. This may include one or more NLU results to choose from, depending on the confidence scores assigned to the NLU results during the evaluation. The selection at block 434 may involve reverse-scaling the confidence scores associated with the set-aside NLU results by converting, for each candidate domain that underwent the evaluation, the confidence score to a numerical score to obtain numerical scores associated with the multiple candidate domains that are comparable. With these comparable numerical scores in hand, the domain-specific NLU result associated with one of the multiple candidate domains can be selected as the candidate NLU result based at least in part on the numerical score associated with that domain-specific NLU result being a highest score among the numerical scores.

The process 400 may alternatively be described, in part, as follows. After a first (prioritized) domain has been evaluated at 412, a determination may be made as to whether the confidence score associated with the domain-specific NLU result for the first domain satisfies a first (e.g., lower) threshold score and a second (e.g., higher) threshold score different from the first threshold score. In other words, this may involve determining if the confidence score satisfies (e.g., meets or exceeds) a second threshold score, and, hence, a first threshold score. If both threshold scores are satisfied, the selective evaluation of the multiple candidate domains may be stopped at block 426. If, on the other hand, the confidence score associated with the domain-specific NLU result for the first domain satisfies the first (e.g., lower) threshold score, but fails to satisfy the second (e.g., higher) threshold score, the NLU result 156 with such a confidence score is set aside at block 430 as a backup option to use for responding to the user speech, and the process 400 proceeds to block 432, as described above. If the confidence score associated with the domain-specific NLU result for the first domain satisfies neither of the threshold scores, the process 400 may discard that domain-specific NLU result and proceed to the next round of the evaluation.

It is to be appreciated that the speech interface device 102 may receive remote directive data from the remote speech processing system 120 as a result of sending the audio data 114 to the remote speech processing system 120 in parallel, and logic (e.g., the hybrid request selector 128) of the speech interface device 102 may select at least one of local directive data (assuming the NLU result selected at block 326 corresponds to a recognized intent) or the remote directive data as selected directive data, and logic of the speech interface device 102 may perform an action based at least in part on the selected directive data. In the running example of FIG. 1, if the selected directive data includes instructions to turn off the kitchen lights, the speech interface device 102 may perform an action by sending, via the communications interface 112, a command to a second device(s) (e.g., smart kitchen lights) collocated in the environment with the speech interface device 102, causing the second device(s) to "turn off."

Figure 5:
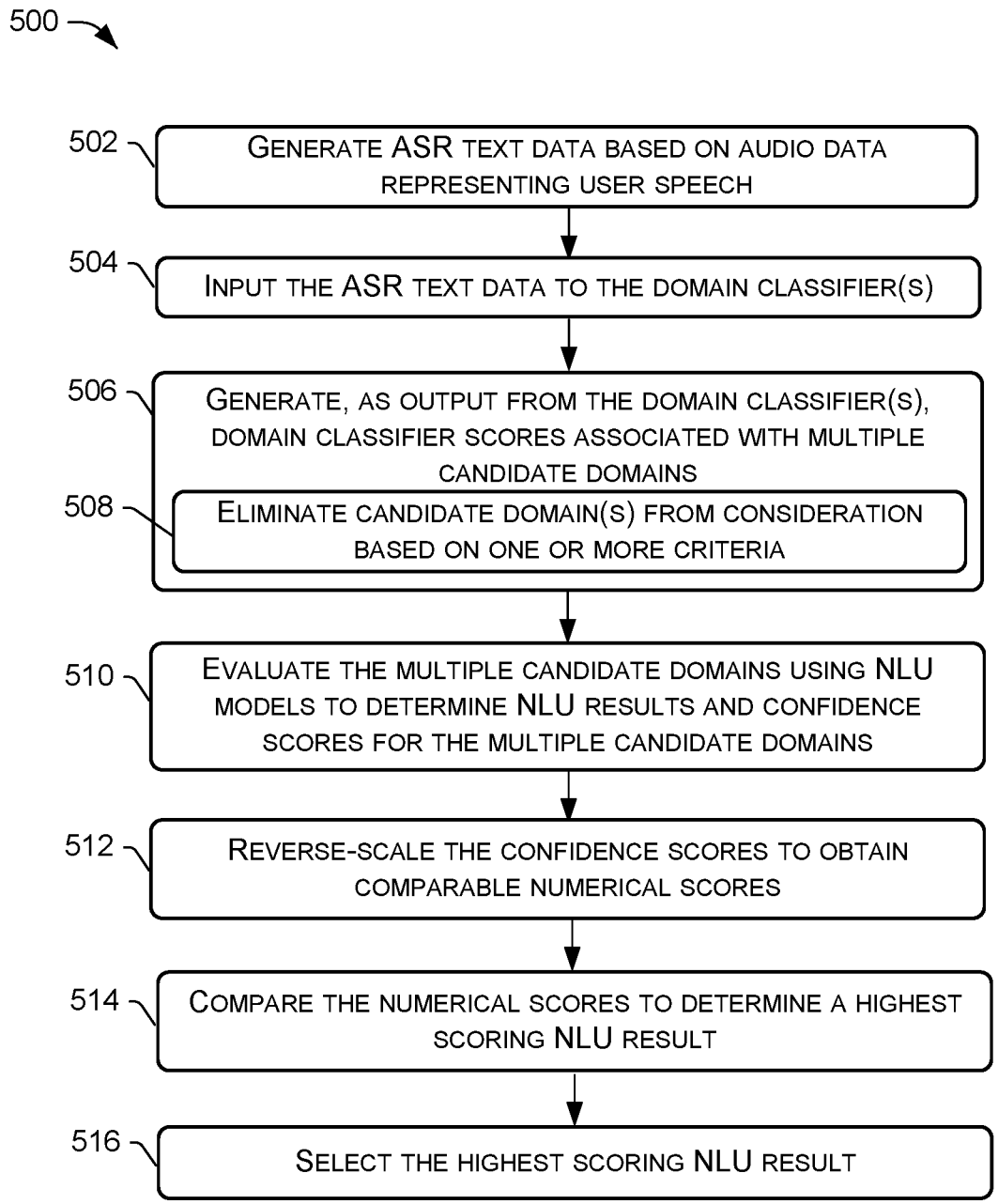
FIG. 5 is a flow diagram of an example process implemented by a speech interface device for performing local NLU processing by evaluating multiple candidate domains and choosing the best NLU result by reverse-scaling the confidence scores for the NLU results.

FIG. 5 is a flow diagram of an example process 500 implemented by a speech interface device for performing local NLU processing by evaluating multiple candidate domains and choosing the best NLU result by reverse-scaling the confidence scores for the NLU results. For discussion purposes, the process 500 is described with reference to the previous figures.

Blocks 502-508 may include the same or similar operations to those described with reference to blocks 302-308 of the process 300, and for the sake of brevity, blocks 502-508 will not be described in detail, as the description of blocks 302-308 can be referenced for these blocks of the process 500.

At 510, the NLU component 142 of the speech interface device 102 may conduct an evaluation of the multiple candidate domains using their corresponding domain-specific NLU models 148. The evaluation at block 510 can be conducted in parallel for the multiple domains, or sequentially, in any suitable order, such as in accordance with a ranked order of the domain classifier scores from a highest score to a lowest score. As part of the evaluation at block 510, the NLU component 142 may input the text data to the domain-specific NLU models 148, and determining, based at least in part on output from the domain-specific NLU models 148, domain-specific NLU results 156 associated with the multiple candidate domains, and associated confidence scores. In particular, the NER component(s) 152 executing on the speech interface device 102 may run the text data through domain-specific NER models 148(A) for the multiple candidate domains, and the IC component 154 executing on the speech interface device 102 may run the text data and the NER results through domain-specific IC models 148(B) for the multiple candidate domains. This may result in determining domain-specific NLU results 156 associated with the multiple candidate domains and their associated confidence scores.

At 512, the confidence scores determined at block 510 may be reverse scaled by converting, for each candidate domain that underwent the evaluation, the confidence score to a numerical score to obtain numerical scores associated with the multiple candidate domains that are comparable.

At 514, the multiple numerical scores may be compared to determine a highest scoring NLU result as a NLU result associated with the highest numerical score.

At 516, the domain-specific NLU result associated with the highest numerical score may be selected as a candidate NLU result. It is to be appreciated that the speech interface device 102 may receive remote directive data from the remote speech processing system 120 as a result of sending the audio data 114 to the remote speech processing system 120 in parallel, and logic (e.g., the hybrid request selector 128) of the speech interface device 102 may select at least one of local directive data (assuming the NLU result selected at block 326 corresponds to a recognized intent) or the remote directive data as selected directive data, and logic of the speech interface device 102 may perform an action based at least in part on the selected directive data. In the running example of FIG. 1, if the selected directive data includes instructions to turn off the kitchen lights, the speech interface device 102 may perform an action by sending, via the communications interface 112, a command to a second device(s) (e.g., smart kitchen lights) collocated in the environment with the speech interface device 102, causing the second device(s) to "turn off."

Figure 6:
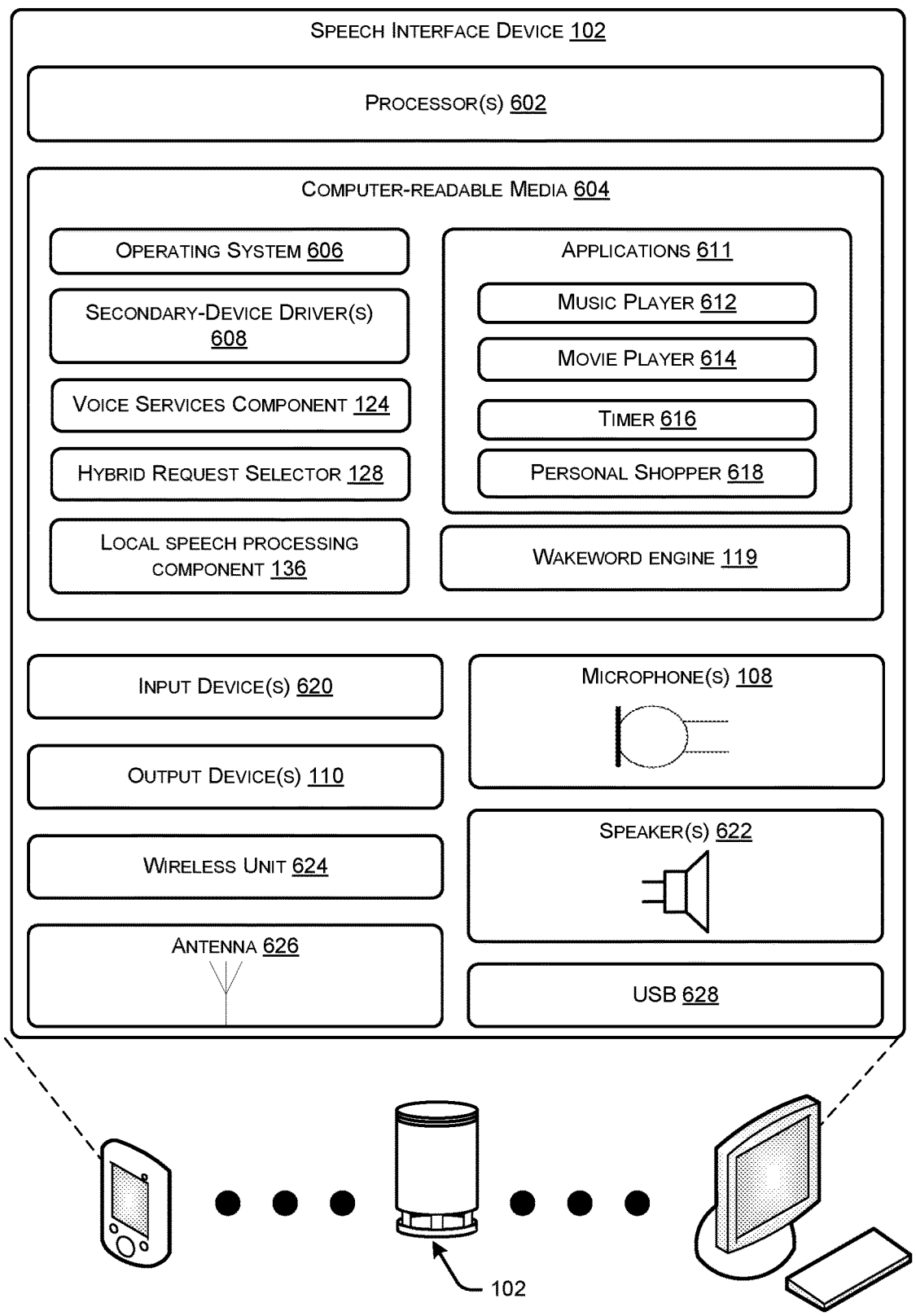
FIG. 6 illustrates example components of an electronic device, such as the speech interface device of FIG. 1.

FIG. 6 illustrates example components of an electronic device, such as the speech interface device 102 of FIG. 1. The speech interface device 102 may be implemented as a standalone device that is relatively simple in terms of functional capabilities with limited input/output components, memory, and processing capabilities. For instance, the speech interface device 102 may not have a keyboard, keypad, or other form of mechanical input. Nor does it have a display (other than simple lights, for instance) or touch screen to facilitate visual presentation and user touch input. Instead, the speech interface device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the speech interface device 102 is through voice input and audible output.

The speech interface device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the speech interface device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the speech interface device 102 includes one or more processors 602 and computer-readable media 604 (often referred to herein as "memory" of the speech interface device 102, and/or "local memory" of the speech interface device 102). In some implementations, the processors(s) 602 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 602 may possess its own local memory, which also may store program modules, program data, and/or one or more operating systems.

The computer-readable media 604 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 604 may be implemented as computer-readable storage media ("CRSM"), which may be any available physical media accessible by the processor(s) 602 to execute instructions stored on the memory 604. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

Several modules such as instruction, datastores, and so forth may be stored within the computer-readable media 604 and configured to execute on the processor(s) 602. A few example functional modules are shown as applications stored in the computer-readable media 604 and executed on the processor(s) 602, although the same functionality may alternatively be implemented in hardware, firmware, or as a system on a chip (SOC). At least some of the components shown in FIG. 1 may also be stored in the computer-readable media 604 and/or executable by the processor(s) 602 to implement the functionality described herein. For example, the voice services component 124, the hybrid request selector 128, and the local speech processing component 136, as well as their subcomponents, may be stored in the computer-readable media 604 and executable by the processor(s) 602 to implement the functionality described herein.

An operating system module 606 may be configured to manage hardware within and coupled to the speech interface device 102 for the benefit of other modules. In addition, the speech interface device 102 may include one or more secondary-device drivers 608 for sending control commands to second devices collocated in an environment with the speech interface device 102. The speech interface device 102 may further including the aforementioned wakeword engine 119.

The speech interface device 102 may also include a plurality of applications 611 stored in the computer-readable media 604 or otherwise accessible to the speech interface device 102. In this implementation, the applications 611 are a music player 612, a movie player 614, a timer 616, and a personal shopper 618. However, the speech interface device 102 may include any number or type of applications and is not limited to the specific examples shown here. The music player 612 may be configured to play songs or other audio files. The movie player 614 may be configured to play movies or other audio visual media. The timer 616 may be configured to provide the functions of a simple timing device and clock. The personal shopper 618 may be configured to assist a user in purchasing items from web-based merchants. When implementing the "hybrid" functionality described herein, where a remote system 116 is unavailable to the speech interface device 102, these applications 611 may be configured to access local resources (e.g., local music or movie libraries, a local shopping list, a local calendar, etc.). In some cases, changes made to these local resources may be synched with remote versions of those resources when the remote system 116 subsequently becomes available to the speech interface device 102.

Generally, the speech interface device 102 has input devices 620 and output devices 110. The input devices 620 may include, without limitation, a keyboard, keypad, mouse, touch screen, joystick, control buttons, etc. In some implementations, one or more microphones 108, introduced in FIG. 1, may function as input devices 620 to receive audio input, such as user voice input. The output device(s) 110, introduced in FIG. 1, may include, without limitation, a display(s), a light element (e.g., LED), a vibrator to create haptic sensations, or the like. In some implementations, one or more speakers 622 may function as output devices 110 to output audio sounds (e.g., audio content, TTS responses, tones at various frequencies, etc.).

A user 104 may interact with the speech interface device 102 by speaking to it, and the one or more microphone(s) 108 captures the user's speech (utterances). The speech interface device 102 can communicate back to the user 104 by emitting audible statements through the speaker(s) 622. In this manner, the user 104 can interact with the speech interface device 102 solely through speech, without use of a keyboard or display.

The speech interface device 102 may further include a wireless unit 624 coupled to an antenna 626 to facilitate a wireless connection to a network. The wireless unit 624 may implement one or more of various wireless and/or IoT technologies, such as Bluetooth® protocol, Bluetooth Low Energy (BLE) protocol, ZigBee® protocol, Z-Wave® protocol, WiFi protocol, and/or any other type of protocol usable to communicate wirelessly between electronic devices in an environment, including those that do and/or do not rely data transmission over the wide area network 118. As such, the speech interface device 102 may be configured to act as a hub that can communicate with second devices in the environment and control the second devices, such as by using protocol stacks, drivers, and adapters to communicate over a suitable communications protocol. A USB port(s) 628 may further be provided as part of the speech interface device 102 to facilitate a wired connection to a network, or a plug-in network device that communicates with other wireless networks. In addition to the USB port 628, or as an alternative thereto, other forms of wired connections may be employed, such as a broadband connection, Transmission Control Protocol/Internet Protocol (TCP/IP) protocol connection, etc. The communications interface 112 of FIG. 1 may include some or all of these components, and/or other components to facilitate communication with other devices.

Accordingly, when implemented as the primarily-voice-operated speech interface device 102, there may be no input devices, such as navigation buttons, keypads, joysticks, keyboards, touch screens, and the like other than the microphone(s) 108. Further, there may be no output such as a display for text or graphical output. The speaker(s) 622 may be the main output device. In one implementation, the speech interface device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the speech interface device 102 may be implemented as an aesthetically appealing device with smooth and rounded surfaces, with one or more apertures for passage of sound waves. The speech interface device 102 may merely have a power cord and optionally a wired interface (e.g., broadband, USB, etc.). As a result, the speech interface device 102 may be generally produced at a low cost. Once plugged in, the speech interface device 102 may automatically self-configure, or with slight aid of the user, and be ready to use. In other implementations, other I/O components may be added to this basic model, such as specialty buttons, a keypad, display, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A speech interface device comprising:
one or more processors; and
memory storing:
a first domain classifier, wherein the first domain classifier is a first trained machine learning model;
a second domain classifier, wherein the second domain classifier is a second trained machine learning model;
a first domain-specific named entity recognition (NER) model and a second domain-specific NER model;
a first domain-specific intent classification (IC) model and a second domain-specific IC model; and
computer-executable instructions that, when executed by the one or more processors, cause performance of operations comprising:
generating, by an automatic speech recognition (ASR) component executing on the speech interface device, text data based at least in part on audio data representing user speech;
inputting, by a domain classifier component executing on the speech interface device, the text data to the first domain classifier;
generating, as output from the first domain classifier, a first domain classifier score associated with a first domain;
inputting, by the domain classifier component, the text data to the second domain classifier;
generating, as output from the second domain classifier, a second domain classifier score associated with a second domain;
comparing the first domain classifier score and the second domain classifier score;
inputting, based on the comparing of the first domain classifier score and the second domain classifier score, the text data to the first domain-specific NER model that corresponds to the first domain;
generating, as output from the first domain-specific NER model, a NER result and a first confidence score associated with the NER result;
inputting the text data and the NER result to the first domain-specific IC model that corresponds to the first domain;
generating, as output from the first domain-specific IC model, an IC result and a second confidence score associated with the IC result,
determining a domain-specific natural language understanding (NLU) result associated with the first domain based at least in part on the NER result and the IC result;
determining a confidence score associated with the domain-specific NLU result based at least in part on the first confidence score and the second confidence score;

determining that the confidence score associated with the domain-specific NLU result satisfies a threshold score; and
selecting the domain-specific NLU result as a candidate NLU result that is usable to cause the speech interface device to perform an action.

2. The speech interface device of claim 1, the operations further comprising, based at least in part on the comparing the first domain classifier score and the second domain classifier score:
prioritizing the first domain; and
deprioritizing the second domain.

3. The speech interface device of claim 1, wherein the memory further stores a third domain classifier that is a third trained machine learning model, the operations further comprising:
inputting, by the domain classifier component, the text data to the third domain classifier;
generating, as output from the third domain classifier, a third domain classifier score associated with a third domain; and
eliminating the third domain from consideration based on at least one of:
the third domain generating an out-of-domain classification based on the text data; or
the third domain classifier score failing to satisfy a target domain classifier score.

4. The speech interface device of claim 1, the operations further comprising, after the determining that the confidence score associated with the domain-specific NLU result satisfies the threshold score:
computing a final confidence score as a function of at least the first domain classifier score and the confidence score associated with the domain-specific NLU result; and
determining that the final confidence score satisfies a second threshold score,
wherein the selecting the domain-specific NLU result as the candidate NLU result is based at least in part on the final confidence score satisfying the second threshold score.

5. A method comprising:
receiving input data by one or more domain classifiers stored in memory of a speech interface device;
generating, as output from the one or more domain classifiers, a first domain classifier score associated with a first domain and a second domain classifier score associated with a second domain;
comparing the first domain classifier score and the second domain classifier score;
receiving, based on the comparing of the first domain classifier score and the second domain classifier score, the input data by one or more domain-specific natural language understanding (NLU) models stored in the memory of the speech interface device that correspond to the first domain;
determining, based at least in part on output from the one or more domain-specific NLU models, a domain-specific NLU result associated with the first domain and a confidence score associated with the domain-specific NLU result; and
selecting, as a candidate NLU result for use in causing the speech interface device to perform an action, the domain-specific NLU result associated with the first domain based at least in part on the confidence score associated with the domain-specific NLU result.

6. The method of claim 5, further comprising:
determining that the confidence score associated with the domain-specific NLU result satisfies a threshold score,
wherein the selecting the domain-specific NLU result associated with the first domain as the candidate NLU result is based at least in part on the confidence score associated with the domain-specific NLU result satisfying the threshold score.

7. The method of claim 5, further comprising, based at least in part on the comparing the first domain classifier score and the second domain classifier score:
prioritizing the first domain; and
deprioritizing the second domain.

8. The method of claim 5, further comprising:
determining that the confidence score associated with the domain-specific NLU result satisfies a first threshold score and a second threshold score different from the first threshold score,
wherein the selecting the domain-specific NLU result associated with the first domain as the candidate NLU result is based at least in part on the confidence score associated with the domain-specific NLU result satisfying the first threshold score and the second threshold score.

9. The method of claim 5, further comprising:
determining that the confidence score associated with the domain-specific NLU result:
satisfies a first threshold score; and
fails to satisfy a second threshold score different from the first threshold score;
receiving, after the determining the domain-specific NLU result associated with the first domain and the confidence score associated with the domain-specific NLU result, the input data by one or more second domain-specific NLU models stored in the memory of the speech interface device that correspond to the second domain; and
determining, based at least in part on output from the one or more second domain-specific NLU models, a second domain-specific NLU result associated with the second domain and a second confidence score associated with the second domain-specific NLU result;
determining that the second confidence score associated with the second domain-specific NLU result:
satisfies the first threshold score; and
fails to satisfy the second threshold score; and
wherein the selecting the domain-specific NLU result associated with the first domain as the candidate NLU result comprises:
converting the confidence score to a first numerical score;
converting the second confidence score to a second numerical score that is comparable with the first numerical score; and
selecting, as the candidate NLU result, the domain-specific NLU result associated with the first domain based at least in part on comparing the first numerical score and the second numerical score.

10. The method of claim 5, wherein:
the one or more domain-specific NLU models that correspond to the first domain include:
a domain-specific named entity recognition (NER) model that corresponds to the first domain; and
a domain-specific intent classification (IC) model that corresponds to the first domain; and the receiving of the input data by the one or more domain-specific NLU models and the determining the domain-specific NLU result and the confidence score further comprises:
  receiving the input data by the domain-specific NER model that corresponds to the first domain;
  generating, as output from the domain-specific NER model that corresponds to the first domain, a NER result and a first confidence score associated with the NER result;
  receiving the input data and the NER result by the domain-specific IC model that corresponds to the first domain;
  generating, as output from the domain-specific IC model that corresponds to the first domain, an IC result and a second confidence score associated with the IC result;
  determining the domain-specific NLU result associated with the first domain based at least in part on the NER result and the IC result; and
  determining the confidence score associated with the domain-specific NLU result based at least in part on the first confidence score and the second confidence score.

11. The method of claim 5, further comprising:
generating, as the output from the one or more domain classifiers, a third domain classifier score associated with a third domain; and
eliminating the third domain from consideration based on at least one of:
  the third domain generating an out-of-domain classification based on the input data; or
  the third domain classifier score failing to satisfy a target domain classifier score.

12. The method of claim 5, further comprising:
computing a final confidence score as a function of at least the first domain classifier score and the confidence score associated with the domain-specific NLU result; and
determining that the final confidence score satisfies a threshold score,
wherein the selecting the domain-specific NLU result as the candidate NLU result is based at least in part on the final confidence score satisfying the threshold score.

13. The method of claim 5, further comprising:
generating, by an automatic speech recognition (ASR) component executing on the speech interface device, the input data based at least in part on audio data representing user speech;
sending, by the speech interface device, the audio data to a remote speech processing system;
receiving, by the speech interface device, first directive data from the remote speech processing system;
determining to use the candidate NLU result in lieu of using the first directive data;
generating, by the speech interface device, second directive data based at least in part on the candidate NLU result; and
performing, by the speech interface device, the action based at least in part on the second directive data.

14. A speech interface device comprising:
one or more processors; and
memory storing:
  one or more domain classifiers;
  one or more first domain-specific natural language understanding (NLU) models that correspond to a first domain;
  one or more second domain-specific NLU models that correspond to a second domain; and
  computer-executable instructions that, when executed by the one or more processors, cause performance of operations comprising:
    receiving input data by the one or more domain classifiers;
    generating, as output from the one or more domain classifiers, a first domain classifier score associated with the first domain and a second domain classifier score associated with the second domain;
    comparing the first domain classifier score and the second domain classifier score;
    receiving, based on the comparing of the first domain classifier score and the second domain classifier score, the input data by the one or more first domain-specific NLU models that correspond to the first domain;
    determining, based at least in part on output from the one or more first domain-specific NLU models that correspond to the first domain, a domain-specific NLU result associated with the first domain and a confidence score associated with the domain-specific NLU result; and
    selecting, as a candidate NLU result for use in causing the speech interface device to perform an action, the domain specific NLU result associated with the first domain based at least in part on the confidence score associated with the domain-specific NLU result.

15. The speech interface device of claim 14, the operations further comprising:
determining that the confidence score associated with the domain-specific NLU result satisfies a threshold score,
wherein the selecting the domain-specific NLU result associated with the first domain as the candidate NLU result is based at least in part on the confidence score associated with the domain-specific NLU result satisfying the threshold score.

16. The speech interface device of claim 14, the operations further comprising:
determining that the confidence score associated with the domain-specific NLU result satisfies a first threshold score and a second threshold score different from the first threshold score,
wherein the selecting the domain-specific NLU result associated with the first domain as the candidate NLU result is based at least in part on the confidence score associated with the domain-specific NLU result satisfying the first threshold score and the second threshold score.

17. The speech interface device of claim 14, the operations further comprising:
determining that the confidence score associated with the domain-specific NLU result:
satisfies a first threshold score; and
fails to satisfy a second threshold score different from the first threshold score,
receiving, after the determining the domain-specific NLU result associated with the first domain and the confidence score associated with the domain-specific NLU result, the input data by the one or more second domain-specific NLU models that correspond to the second domain; and
determining, based at least in part on output from the one or more second domain-specific NLU models, a second domain-specific NLU result associated with the second domain and a second confidence score associated with the second domain-specific NLU result;
determining that the second confidence score associated with the second domain-specific NLU result:
satisfies the first threshold score; and
fails to satisfy the second threshold score; and
wherein the selecting the domain-specific NLU result associated with the first domain as the candidate NLU result comprises:
converting the confidence score to a first numerical score;
converting the second confidence score to a second numerical score that is comparable with the first numerical score; and
selecting, as the candidate NLU result, the domain-specific NLU result associated with the first domain based at least in part on comparing the first numerical score and the second numerical score.

18. The speech interface device of claim 14, wherein:
the one or more first domain-specific NLU models that correspond to the first domain include:
a domain-specific named entity recognition (NER) model that corresponds to the first domain; and
a domain-specific intent classification (IC) model that corresponds to the first domain; and
the receiving of the input data by the one or more domain-specific NLU models and the determining the domain-specific NLU result and the confidence score further comprises:
receiving the input data by the domain-specific NER model that corresponds to the first domain;
generating, as output from the domain-specific NER model that corresponds to the first domain, a NER result and a first confidence score associated with the NER result;
receiving the input data and the NER result by the domain-specific IC model that corresponds to the first domain;
generating, as output from the domain-specific IC model that corresponds to the first domain, an IC result and a second confidence score associated with the IC result;
determining the domain-specific NLU result associated with the first domain based at least in part on the NER result and the IC result; and
determining the confidence score associated with the domain-specific NLU result based at least in part on the first confidence score and the second confidence score.

19. The speech interface device of claim 14, the operations further comprising:
generating, as the output from the one or more domain classifiers, a third domain classifier score associated with a third domain; and
eliminating the third domain from consideration based on at least one of:
the third domain generating an out-of-domain classification based on the input data; or
the third domain classifier score failing to satisfy a target domain classifier score.

20. The speech interface device of claim 14, the operations further comprising:
computing a final confidence score as a function of at least the first domain classifier score and the confidence score associated with the domain-specific NLU result; and
determining that the final confidence score satisfies a threshold score,
wherein the selecting the domain-specific NLU result as the candidate NLU result is based at least in part on the final confidence score satisfying the threshold score.

\* \* \* \* \*